(12) United States Patent
Sui et al.

(10) Patent No.: US 12,156,131 B2
(45) Date of Patent: Nov. 26, 2024

(54) CELL SELECTION METHOD AND APPARATUS

(71) Applicant: Honor Device Co., Ltd., Shenzhen (CN)

(72) Inventors: Feifei Sui, Shenzhen (CN); Haibo Xu, Shenzhen (CN); Lichao Fu, Shenzhen (CN); Weiguang Sun, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 277 days.

(21) Appl. No.: 17/758,544

(22) PCT Filed: Jan. 13, 2021

(86) PCT No.: PCT/CN2021/071484
§ 371 (c)(1),
(2) Date: Jul. 8, 2022

(87) PCT Pub. No.: WO2021/143722
PCT Pub. Date: Jul. 22, 2021

(65) Prior Publication Data
US 2023/0051540 A1    Feb. 16, 2023

(30) Foreign Application Priority Data
Jan. 14, 2020 (CN) .......................... 202010039106.8

(51) Int. Cl.
*H04W 48/20* (2009.01)
*H04W 36/00* (2009.01)
(Continued)

(52) U.S. Cl.
CPC ....... *H04W 48/20* (2013.01); *H04W 36/0061* (2013.01); *H04W 36/008375* (2023.05);
(Continued)

(58) Field of Classification Search
CPC ............. H04W 48/20; H04W 36/0085; H04W 36/0061; H04W 48/08; H04W 48/16; H04W 36/008375; H04W 36/304
See application file for complete search history.

(56) References Cited

U.S. PATENT DOCUMENTS 10,575,237 B2    2/2020 Kim et al.
2016/0165492 A1  6/2016 Lei et al.
(Continued)

FOREIGN PATENT DOCUMENTS

CN    101965058 A    2/2011
CN    107371202 A    11/2017
(Continued)

OTHER PUBLICATIONS

Liu, X. et al., "Research on 4G/New Radio Multinet Synergy and Interoperability", China Academic Journal Electronic Publishing House, Dec. 2019, 18 Pages.
(Continued)

*Primary Examiner* — Brenda H Pham
(74) *Attorney, Agent, or Firm* — Slater Matsil, LLP

(57) ABSTRACT

Embodiments of this application provide a cell selection method and an apparatus, and relate to the communications field. A terminal may determine a first measurement frequency and a 5G anchor cell at the first measurement frequency based on prior historical information. The terminal may shorten evaluation duration corresponding to a 5G anchor cell that meets a preferred condition at a first measurement frequency, so as to improve a probability that the terminal camps on the 5G anchor cell.

20 Claims, 16 Drawing Sheets

(51) Int. Cl.
  *H04W 36/30*  (2009.01)
  *H04W 48/08*  (2009.01)
  *H04W 48/16*  (2009.01)

(52) U.S. Cl.
  CPC ..... *H04W 36/0085* (2018.08); *H04W 36/304* (2023.05); *H04W 48/08* (2013.01); *H04W 48/16* (2013.01)

(56) References Cited

U.S. PATENT DOCUMENTS

| | | |
|---|---|---|
| 2019/0007883 A1 | 1/2019 | Dang et al. |
| 2019/0166576 A1 | 5/2019 | Kim et al. |
| 2019/0261236 A1 | 8/2019 | Wang et al. |
| 2019/0373523 A1 | 12/2019 | Panchal et al. |
| 2021/0120468 A1 | 4/2021 | Stauffer et al. |

FOREIGN PATENT DOCUMENTS

| | | |
|---|---|---|
| CN | 108307378 A | 7/2018 |
| CN | 108738096 A | 11/2018 |
| CN | 109699059 A | 4/2019 |
| CN | 109862595 A | 6/2019 |
| CN | 110022591 A | 7/2019 |
| CN | 110381550 A | 10/2019 |
| RU | 2640793 C2 | 1/2018 |
| WO | 2016082656 A1 | 6/2016 |
| WO | 2019154229 A1 | 8/2019 |
| WO | 2020005880 A1 | 1/2020 |

OTHER PUBLICATIONS

Huawei., "Cell selection for NR non-standalone and NR standalone UE operation", 3GPP TSG-RAN WG2 Meeting #96, R2-168569, Nov. 14-18, 2016, 4 Pages, Reno, Nevada.

CELL SELECTION METHOD AND APPARATUS

CROSS-REFERENCE TO RELATED APPLICATIONS

This application is a National Stage of International Application No. PCT/CN2021/071484, filed Jan. 13, 2021, which claims priority to Chinese Patent Application No. 202010039106.8, filed Jan. 14, 2020, both of which are hereby incorporated by reference in their entireties.

TECHNICAL FIELD

Embodiments of this application relate to the communications field, and in particular, to a cell selection method and an apparatus.

BACKGROUND

In existing non-standalone (Non Standalone, NSA) networking, a 5G anchor cell generally exists in a network. In a current cell selection process, a frequency is usually selected based on an energy level of a frequency to which a cell belongs or a cell measurement result. If a frequency corresponding to the 5G anchor cell is not selected, the terminal camps on a non-5G anchor cell, for example, a 4G cell. However, actually, the terminal can obtain a higher transmission rate when camping on the 5G anchor cell compared with when camping on the 4G cell.

SUMMARY

This application provides a cell selection method and an apparatus, so as to improve, to some extent, a probability that a terminal camps on a 5G anchor cell.

To achieve the foregoing objective, this application uses the following technical solutions:

According to a first aspect, an embodiment of this application provides a cell selection method. The method includes: A terminal receives a configuration message sent by a network side, where the configuration message includes frequency information. The terminal determines a first measurement frequency based on locally stored prior historical information and the configuration message, where a historically camped cell corresponding to the first measurement frequency includes a 5G anchor cell, and the 5G anchor cell is a Long Term Evolution (LTE) cell that uses a 5G cell as a secondary cell. Then, the terminal performs cell measurement on the first measurement frequency, and obtains a measurement result of the first measurement frequency, where the measurement result includes first cell identity information of a first cell at the first measurement frequency and a first cell measurement result corresponding to the first cell identity information. Then, the terminal determines, based on the prior historical information and the first cell identity information, whether the first cell is a 5G anchor cell. In this application, if the first cell is a 5G anchor cell and meets a preferred condition, the terminal evaluates the first cell based on first preset duration. If the first cell is not a 5G anchor cell, the terminal evaluates the first cell based on a second preset duration, where the second preset duration is greater than the first preset duration. When an evaluation result of the first cell meets a preset condition, the terminal camps on the first cell, or the terminal reports the measurement result of the first cell to a base station.

Based on the foregoing manner, it is implemented that the terminal may determine, based on the locally stored prior historical information, the first measurement frequency, where the first measurement frequency is a 5G LTE frequency and the historically camped cell corresponding to the frequency includes a 5G anchor cell, and perform cell measurement on the first measurement frequency. Then, the terminal may further determine, based on the prior historical information, the 5G anchor cell that is at the first measurement frequency and whose cell measurement result has been obtained, and optimize an evaluation policy of the 5G anchor cell that meets the preferred condition, so as to improve a probability that the 5G anchor cell is selected as a serving cell, thereby improving communication quality of the terminal.

In a possible implementation, the preferred condition includes: A measurement result of the first cell is greater than or equal to a first threshold, or a difference between quality of service of a currently camped serving cell that is obtained by the terminal through measurement and the first cell measurement result is less than or equal to a second threshold.

Based on the foregoing manner, it is implemented that the terminal may pre-determine a 5G anchor cell that meets a requirement for a "good cell", so as to improve, in a subsequent process, the probability that the 5G anchor cell is selected as a serving cell.

In a possible implementation, the prior historical information includes historical frequency information of at least one frequency and cell information of a historically camped cell corresponding to each of the at least one frequency, where the cell information includes cell type information.

Based on the foregoing manner, it is implemented that the terminal may store prior historical information, and the prior historical information records frequency information of each frequency and cell information of a cell at each frequency. The terminal may determine the 5G LTE frequency and the 5G anchor cell based on the frequency information and/or the cell information.

In a possible implementation, the frequency information includes reselection frequency information of a reselection frequency, a priority corresponding to the reselection frequency, a first measurement threshold, and second preset evaluation duration; and that the terminal determines a first measurement frequency based on locally stored prior historical information and the configuration message includes: The terminal determines a first measurement frequency based on the prior historical information and the reselection frequency information.

Based on the foregoing manner, it is implemented that in a reselection scenario, the terminal may determine, based on the prior historical information, the first measurement frequency in reselection frequencies configured on the network side, that is, determine a frequency of the historically camped cell including a 5G anchor cell.

In a possible implementation, after the terminal determines a first measurement frequency based on the prior historical information and the reselection frequency information, the method includes: If the quality of service of the serving cell on which the terminal currently camps is greater than the first measurement threshold, and a priority corresponding to the first measurement frequency is lower than or equal to a first priority corresponding to a frequency to which the serving cell belongs, the terminal increases the first measurement threshold to be greater than the quality of service of the serving cell.

Based on the foregoing manner, it is implemented that after the terminal determines that the first measurement frequency needs to be measured, the terminal may improve the first measurement threshold configured on the network side, so that the quality of service of the serving cell is less than the first measurement threshold, and then cell measurement can be performed on all frequencies configured on the network side, including performing cell measurement on frequencies whose priorities is higher than, equal to or lower than a priority of the frequency to which the serving cell belongs. That is, the measurement coverage includes a low priority 5G LTE frequency that is not originally in a measurement range.

In a possible implementation, after the terminal determines a first measurement frequency based on the prior historical information and the reselection frequency information, the method includes: If the quality of service of the serving cell on which the terminal currently camps is greater than the first measurement threshold, and the priority corresponding to the first measurement frequency is lower than or equal to the first priority corresponding to the frequency to which the serving cell belongs, the terminal determines that the priority of the first measurement frequency is a second priority, where the second priority is higher than the first priority. Correspondingly, evaluating the first cell based on the first preset duration includes: The terminal evaluates the first cell by using a high-priority threshold, where the high-priority threshold is included in the configuration message.

Based on the foregoing manner, it is implemented that the terminal may improve a priority of a first measurement frequency that has a low priority, so that the priority of the first measurement frequency becomes a high priority, so that the first measurement frequency that does not meet a measurement requirement meets the measurement requirement.

In a possible implementation, if the first cell is a 5G anchor cell and meets the preferred condition, the method further includes: If the priority of the first measurement frequency is less than or equal to a first priority corresponding to a frequency of a serving cell on which the terminal currently camps, determining that the priority of the first measurement frequency is a second priority, where the second priority is higher than the first priority; and evaluating the first cell based on the first preset duration includes: The terminal evaluates the first cell by using a high-priority threshold, where the high-priority threshold is included in the configuration message.

Based on the foregoing manner, it is implemented that the terminal may improve the priority of the first measurement frequency, so that the terminal evaluates the first cell by using the high-priority threshold, thereby improving a probability that the first cell is evaluated successfully, so as to further improve a probability that the first cell (that is, the 5G anchor cell) is selected as the serving cell.

In a possible implementation, the preset rule is a cell reselection rule, and the preset rule includes: A measurement result of the first cell is optimal in the obtained cell measurement results; or a difference between the first cell measurement result and the obtained optimal value in the cell measurement results is less than or equal to a third threshold.

Based on the foregoing manner, it may be implemented that in a reselection scenario, when the terminal determines that there are a plurality of evaluated cells at a same frequency, the terminal may select a first cell that meets a preset rule, that is, a 5G anchor cell for camping on.

In a possible implementation, the frequency information includes frequency handover information of a handover frequency, a second measurement threshold, and second preset evaluation duration. That the terminal determines a first measurement frequency based on locally stored prior historical information and the configuration message includes: The terminal determines the first measurement frequency based on the prior historical information and the frequency handover information; and if the quality of service of the serving cell on which the terminal currently camps is less than the second measurement threshold, and the serving cell is not a 5G anchor cell, the terminal increases the second measurement threshold to be greater than the quality of service of the serving cell.

Based on the foregoing manner, it is implemented that in a handover scenario, the terminal may determine, based on the prior historical information, the first measurement frequency in the handover frequencies configured on the network side, that is, determine the frequency of the historically camped cell including the 5G anchor cell. In addition, after determining the first measurement frequency, the terminal may adjust a current measurement policy, so that the first measurement frequency meets a measurement requirement, so as to perform cell measurement on the first measurement frequency.

In a possible implementation, the preset condition is a cell handover condition.

In a possible implementation, before the terminal evaluates the first cell based on the first preset duration, the method further includes: The terminal adds a first cell measurement result to obtain a second cell measurement result, where a difference between the second cell measurement result and the first cell measurement result is less than or equal to a fourth threshold; and evaluating the first cell based on the first preset duration includes: The terminal evaluates a measurement result of the second cell; and the measurement result of the first cell and the measurement result of the second cell include at least one of the following: reference signal received power (RSRP) and a signal to interference plus noise ratio (SINR).

Based on the foregoing manner, it is implemented that the terminal may improve a gain of the first cell, that is, a cell measurement result of the first cell, so that the first cell meets an evaluation criterion, thereby further improving the probability that the first cell is selected as a serving cell.

In a possible implementation, if the first cell is not a 5G anchor cell, and the terminal camps on the first cell, the method further includes: The terminal obtains a system message of a neighboring cell, where the system message includes identity information of the neighboring cell and cell type information corresponding to the identity information of the neighboring cell; and the terminal correspondingly writes the identity information of the neighboring cell and the cell type information into the prior historical information; and the neighboring cell is a cell configured on a network side, or the neighboring cell is a cell from which the terminal can receive the system message.

Based on the foregoing manner, it is implemented that the terminal may obtain the cell identity information and the cell type information of the neighboring cell in a background search manner, and write the cell identity information and the cell type information into the prior historical information. The terminal may perform a subsequent camping operation based on the obtained prior historical information.

In a possible implementation, the cell type information is included in a system message SIB2 of the neighboring cell.

Based on the foregoing manner, it is implemented that in a background search process, the terminal can obtain the cell type information of the neighboring cell by reading the SIB2 of the neighboring cell, and write the cell type information into the prior historical information.

According to a second aspect, an embodiment of this application provides a cell selection method. The method includes: A terminal determines at least one candidate frequency based on locally stored prior historical information, where at least one 5G LTE frequency is included in the at least one candidate frequency, a historically camped cell corresponding to the 5G LTE frequency includes a 5G anchor cell, and the 5G anchor cell is a Long Term Evolution (LTE) cell that uses a 5G cell as a secondary cell; the terminal performs energy scanning on the at least one candidate frequency, to obtain an energy scanning result of a single candidate frequency in the at least one candidate frequency; if a preferred frequency is included in the at least one 5G LTE frequency, the terminal preferentially performs a cell search on the preferred frequency, where an energy scanning result of the preferred frequency meets a preferred condition; and if a first cell that meets a camping condition exists at the preferred frequency, the terminal camps on the first cell.

Based on the foregoing manner, it is implemented that the terminal may improve a search order of a preferred frequency that meets a preferred condition, so that the preferred frequency preferentially performs the cell search, thereby improving a probability that a 5G anchor cell at the preferred frequency is selected as a serving cell.

In a possible implementation, the prior historical information includes frequency information of at least one candidate frequency and cell information of a cell at a single candidate frequency. That the terminal determines at least one candidate frequency based on locally stored prior historical information includes: The terminal determines a 5G LTE frequency based on the frequency information, where the frequency information includes frequency type information; or the terminal determines a 5G LTE frequency based on the cell information, where the cell information includes cell type information.

Based on the foregoing manner, it is implemented that the terminal may determine a frequency type of each frequency by retrieving the locally stored prior historical information, so as to obtain a frequency whose frequency type is a 5G LTE frequency.

In a possible implementation, the preferred condition includes: An energy scanning result of the preferred frequency is greater than or equal to a first threshold; or a difference between an energy scanning result corresponding to a candidate frequency with a largest energy scanning result and an energy scanning result corresponding to the preferred frequency is less than or equal to a second threshold.

Based on the foregoing manner, it is implemented that the terminal may perform a subsequent optimization process on a 5G LTE frequency that meets the preferred condition, and does not need to perform a subsequent optimization process on a 5G LTE frequency and a non-5G LTE frequency that do not meet the preferred condition.

In a possible implementation, that the terminal camps on the first cell includes: The terminal obtains a cell search result of the preferred frequency, where the cell search result includes cell identity information and a cell measurement result corresponding to the cell identity information; and the terminal determines a preferred cell based on the prior historical information, the cell identity information, and the corresponding cell measurement result, and camps on the preferred cell; and the preferred cell is a 5G anchor cell that meets the camping condition.

Based on the foregoing manner, it is implemented that the terminal may further determine a 5G anchor cell at a same frequency by retrieving the prior historical information based on cell identity information of each cell in the obtained cell search result, and the terminal may attempt to camp on the 5G anchor cell that meets the camping condition, thereby improving communication quality of the terminal.

In a possible implementation, the camping condition includes: The cell measurement result of the preferred cell is optimal in the obtained cell measurement results; or a difference between the cell measurement result of the preferred cell and the obtained optimal value of the cell measurement result is less than or equal to a fourth threshold.

Based on the foregoing manner, it is implemented that the terminal may select, based on a preset camping condition, a 5G anchor cell that meets a criterion for a "good cell" at a same frequency, and camp on the 5G anchor cell.

In a possible implementation, if the serving cell on which the terminal camps is a non-5G anchor cell, the method further includes: The terminal obtains a system message of a neighboring cell, where the system message includes identity information of the neighboring cell and cell type information corresponding to the identity information of the neighboring cell; and the terminal correspondingly writes the identity information of the neighboring cell and the cell type information into the prior historical information; and the neighboring cell is a cell configured on a network side, or the neighboring cell is a cell from which the terminal can receive the system message.

In a possible implementation, the cell type information is included in a system message SIB2 of a neighboring cell.

According to a third aspect, an embodiment of this application provides an apparatus, where the apparatus includes a memory and a processor, and the memory is coupled to the processor. The memory stores a program instruction, and when the program instruction is run by the processor, the apparatus is enabled to perform the following steps: receiving a configuration message sent by a network side, where the configuration message includes frequency information; determining a first measurement frequency based on locally stored prior historical information and a configuration message, where a historically camped cell corresponding to the first measurement frequency includes a 5G anchor cell, and the 5G anchor cell is a Long Term Evolution (LTE) cell that uses the 5G cell as a secondary cell; performing cell measurement on the first measurement frequency to obtain a measurement result of the first measurement frequency, where the measurement result includes first cell identity information and a first cell measurement result corresponding to the first cell identity information; determining, based on the prior historical information and the first cell identity information, whether the first cell is a 5G anchor cell; if the first cell is a 5G anchor cell and meets a preferred condition, evaluating the first cell based on first preset duration, or if the first cell is not a 5G anchor cell, evaluating the first cell based on second preset duration, where the second preset duration is greater than the first preset duration; and when an evaluation result of the first cell meets a preset condition, camping on, by a terminal, the first cell, or reporting, by the terminal, the measurement result of the first cell to a base station.

In a possible implementation, the preferred condition includes: A measurement result of the first cell is greater than or equal to a first threshold, or a difference between quality of service of a currently camped serving cell that is obtained by the terminal through measurement and the first cell measurement result is less than or equal to a second threshold.

In a possible implementation, the prior historical information includes historical frequency information of at least one frequency and cell information of a historically camped cell corresponding to each of the at least one frequency, where the cell information includes cell type information.

In a possible implementation, the frequency information includes reselection frequency information of a reselection frequency, a priority corresponding to the reselection frequency, a first measurement threshold, and second preset evaluation duration; and when the program instruction is run by the processor, the apparatus is enabled to perform the following steps: determining the first measurement frequency based on the prior historical information and the reselection frequency information.

In a possible implementation, when the program instruction is run by the processor, the apparatus is enabled to perform the following step: If the quality of service of the serving cell on which the terminal currently camps is greater than the first measurement threshold, and the priority corresponding to the first measurement frequency is less than or equal to a first priority corresponding to a frequency to which the serving cell belongs, increasing the first measurement threshold to be greater than the quality of service of the serving cell.

In a possible implementation, when the program instruction is run by the processor, the apparatus is enabled to perform the following step: If the quality of service of the serving cell on which the terminal currently camps is greater than the first measurement threshold, and the priority corresponding to the first measurement frequency is lower than or equal to the first priority corresponding to the frequency to which the serving cell belongs, determining, by the terminal, that the priority of the first measurement frequency is a second priority, where the second priority is higher than the first priority. Correspondingly, evaluating the first cell based on the first preset duration includes: The terminal evaluates the first cell by using a high-priority threshold, where the high-priority threshold is included in the configuration message.

In a possible implementation, if the first cell is a 5G anchor cell and meets a preferred condition, when the program instruction is run by the processor, the apparatus is enabled to perform the following step: If the priority of the first measurement frequency is less than or equal to a first priority corresponding to a frequency of a serving cell on which the terminal currently camps, determining that the priority of the first measurement frequency is a second priority, where the second priority is higher than the first priority; and evaluating the first cell by using a high-priority threshold, where the high-priority threshold is included in the configuration message.

In a possible implementation, the preset rule is a cell reselection rule, and the preset rule includes: A measurement result of the first cell is optimal in the obtained cell measurement results; or a difference between the first cell measurement result and the obtained optimal value in the cell measurement results is less than or equal to a third threshold.

In a possible implementation, the frequency information includes frequency handover information of a frequency handover, a second measurement threshold, and second preset evaluation duration. When the program instruction is run by the processor, the apparatus is enabled to perform the following steps: determining the first measurement frequency based on the prior historical information and the frequency handover information; and if the quality of service of the serving cell on which the terminal currently camps is less than the second measurement threshold, and the serving cell is not a 5G anchor cell, increasing the second measurement threshold to be greater than the quality of service of the serving cell.

In a possible implementation, when the program instruction is run by the processor, the apparatus is enabled to perform the following steps: adding a first cell measurement result to obtain a second cell measurement result, where a difference between the second cell measurement result and the first cell measurement result is less than or equal to a fourth threshold; and evaluating a measurement result of the second cell; and the measurement result of the first cell and the measurement result of the second cell include at least one of the following: reference signal received power (RSRP) and a signal to interference plus noise ratio (SINR).

In a possible implementation, if the first cell is not a 5G anchor cell, and the terminal camps on the first cell, when the program instruction is run by the processor, the apparatus is enabled to perform the following steps: obtaining a system message of a neighboring cell, where the system message includes identity information of the neighboring cell and cell type information corresponding to the identity information of the neighboring cell; and correspondingly writing the identity information of the neighboring cell and the cell type information into the prior historical information; and the neighboring cell is a cell configured on a network side, or the neighboring cell is a cell from which the terminal can receive the system message.

In a possible implementation, the cell type information is included in a system message SIB2 of the neighboring cell.

According to a fourth aspect, an embodiment of this application provides an apparatus, where the apparatus includes a memory and a processor, and the memory is coupled to the processor. The memory stores a program instruction. When the program instruction is run by the processor, the apparatus is enabled to perform the following steps: determining at least one candidate frequency based on locally stored prior historical information, where at least one 5G LTE frequency is included in the at least one candidate frequency, a historically camped cell corresponding to the 5G LTE frequency includes a 5G anchor cell, and the 5G anchor cell is a Long Term Evolution (LTE) cell that uses a 5G cell as a secondary cell; performing energy scanning on the at least one candidate frequency, to obtain an energy scanning result of a single candidate frequency in the at least one candidate frequency; if a preferred frequency is included in the at least one 5G LTE frequency, preferentially performing a cell search on the preferred frequency, where an energy scanning result of the preferred frequency meets a preferred condition; and if a first cell that meets a camping condition exists at the preferred frequency, camping on, by a terminal, the first cell.

In a possible implementation, the prior historical information includes frequency information of at least one candidate frequency and cell information of a cell at a single candidate frequency. That the terminal determines at least one candidate frequency based on locally stored prior historical information includes: The terminal determines a 5G LTE frequency based on the frequency information, where the frequency information includes frequency type information; or the terminal determines a 5G LTE frequency based on the cell information, where the cell information includes cell type information.

In a possible implementation, the preferred condition includes: An energy scanning result of the preferred frequency is greater than or equal to a first threshold; or a difference between an energy scanning result corresponding to a candidate frequency with a largest energy scanning result and an energy scanning result corresponding to the preferred frequency is less than or equal to a second threshold.

In a possible implementation, when the program instruction is run by the processor, the apparatus is enabled to perform the following steps: obtaining a cell search result of the preferred frequency, where the cell search result includes cell identity information and a cell measurement result corresponding to the cell identity information; and determining a preferred cell based on the prior historical information, the cell identity information, and the corresponding cell measurement result, and camping on the preferred cell; and the preferred cell is a 5G anchor cell that meets the camping condition.

In a possible implementation, the camping condition includes: The cell measurement result of the preferred cell is optimal in the obtained cell measurement results; or a difference between the cell measurement result of the preferred cell and the obtained optimal value of the cell measurement result is less than or equal to a third threshold.

In a possible implementation, if the serving cell on which the terminal camps is a non-5G anchor cell, when the program instruction is run by the processor, the apparatus is enabled to perform the following steps: obtaining a system message of a neighboring cell, where the system message includes identity information of the neighboring cell and cell type information corresponding to the identity information of the neighboring cell; and correspondingly writing the identity information of the neighboring cell and the cell type information into the prior historical information; and the neighboring cell is a cell configured on a network side, or the neighboring cell is a cell from which the terminal can receive the system message.

In a possible implementation, the cell type information is included in a system message SIB2 of a neighboring cell.

According to a fifth aspect, an embodiment of this application provides an apparatus, where the apparatus includes a transceiver module and a processing module; and the transceiver module is configured to receive a configuration message sent by a network side, where the configuration message includes frequency information. The processing module is configured to determine a first measurement frequency based on locally stored prior historical information and the configuration message, where a historically camped cell corresponding to the first measurement frequency includes a 5G anchor cell, and the 5G anchor cell is a Long Term Evolution (LTE) cell that uses a 5G cell as a secondary cell. The processing module is configured to perform cell measurement on the first measurement frequency to obtain a measurement result of the first measurement frequency, where the measurement result includes first cell identity information and a first cell measurement result corresponding to the first cell identity information. The processing module is further configured to determine, based on the prior historical information and the first cell identity information, whether the first cell is a 5G anchor cell. The processing module is further configured to: If the first cell is a 5G anchor cell and meets a preferred condition, evaluate the first cell based on first preset duration. The processing module is further configured to: If the first cell is not a 5G anchor cell, evaluate the first cell based on second preset duration, where the second preset duration is greater than the first preset duration. The processing module is further configured to: When an evaluation result of the first cell meets a preset condition, camp on the first cell, or report, by the transceiver module, the measurement result of the first cell to a base station.

In a possible implementation, the preferred condition includes: A measurement result of the first cell is greater than or equal to a first threshold, or a difference between a cell measurement result of a currently camped serving cell that is obtained by the terminal through measurement and the first cell measurement result is less than or equal to a second threshold.

In a possible implementation, the prior historical information includes historical frequency information of at least one frequency and cell information of a historically camped cell corresponding to each of the at least one frequency, where the cell information includes cell type information.

In a possible implementation, the frequency information includes reselection frequency information of a reselection frequency, a priority corresponding to the reselection frequency, a first measurement threshold, and second preset evaluation duration; and the processing module is specifically configured to determine the first measurement frequency based on the prior historical information and the reselection frequency information.

In a possible implementation, the processing module is further configured to: If the quality of service of the serving cell on which the terminal currently camps is greater than the first measurement threshold, and the priority corresponding to the first measurement frequency is less than or equal to a first priority corresponding to a frequency to which the serving cell belongs, increase, by the terminal, the first measurement threshold to be greater than the quality of service of the serving cell.

In a possible implementation, the processing module is further configured to: If the quality of service of the serving cell on which the terminal currently camps is greater than the first measurement threshold, and the priority corresponding to the first measurement frequency is lower than or equal to the first priority corresponding to the frequency to which the serving cell belongs, determine that the priority of the first measurement frequency is a second priority, where the second priority is higher than the first priority. The processing module may be further specifically configured to evaluate the first cell by using a high-priority threshold, where the high-priority threshold is included in the configuration message.

In a possible implementation, if the first cell is a 5G anchor cell and meets a preferred condition, the processing module is further configured to: If the priority of the first measurement frequency is less than or equal to a first priority corresponding to a frequency of a serving cell on which the terminal currently camps, determine that the priority of the first measurement frequency is a second priority, where the second priority is higher than the first priority; and the processing module is further configured to evaluate the first cell by using a high-priority threshold, where the high-priority threshold is included in the configuration message.

In a possible implementation, the preset rule is a cell reselection rule, and the preset rule includes: A measurement result of the first cell is optimal in the obtained cell measurement results; or a difference between the first cell measurement result and the obtained optimal value in the cell measurement results is less than or equal to a third threshold.

In a possible implementation, the frequency information includes frequency handover information of a handover frequency, a second measurement threshold, and second preset evaluation duration. The processing module is specifically configured to determine the first measurement frequency based on the prior historical information and the frequency handover information; and if the quality of service of the serving cell on which the terminal currently camps is less than the second measurement threshold, and the serving cell is not a 5G anchor cell, the processing module increases the second measurement threshold to be greater than the quality of service of the serving cell.

In a possible implementation, the preset condition is a cell handover condition.

In a possible implementation, the processing module is further configured for the terminal to add a first cell measurement result to obtain a second cell measurement result, where a difference between the second cell measurement result and the first cell measurement result is less than or equal to a fourth threshold; and the processing module may be further specifically configured for the terminal to evaluate a measurement result of the second cell; and the measurement result of the first cell and the measurement result of the second cell include at least one of the following: reference signal received power (RSRP) and a signal to interference plus noise ratio (SINR).

In a possible implementation, if the first cell is not a 5G anchor cell, and the terminal camps on the first cell, the processing module is further configured to obtain a system message of a neighboring cell, where the system message includes identity information of the neighboring cell and cell type information corresponding to the identity information of the neighboring cell. The processing module is further configured to correspondingly write the identity information of the neighboring cell and the cell type information into the prior historical information, where the neighboring cell is a cell configured on a network side, or the neighboring cell is a cell from which the terminal can receive the system message.

In a possible implementation, the cell type information is included in a system message SIB2 of the neighboring cell.

According to a sixth aspect, an embodiment of this application provides an apparatus, where the apparatus includes a processing module, an energy scanning module, and a cell search module. The processing module is configured to determine at least one candidate frequency according to locally stored prior historical information, where at least one 5G LTE frequency is included in the at least one candidate frequency, a historical camped cell corresponding to the 5G LTE frequency includes a 5G anchor cell, and the 5G anchor cell is a long-term evolved LTE cell that uses the 5G cell as a secondary cell. The energy scanning module is configured to perform energy scanning on the at least one candidate frequency to obtain an energy scanning result of a single candidate frequency in the at least one candidate frequency. The cell search module is configured to: If a preferred frequency is included in at least one 5G LTE frequency, preferentially perform a cell search on the preferred frequency, where an energy scanning result of the preferred frequency meets a preferred condition. The processing module is further configured to: If a first cell that meets a camping condition exists at a preferred frequency, camp on the first cell.

In a possible implementation, the prior historical information includes frequency information of at least one candidate frequency and cell information of a cell at a single candidate frequency. That the terminal determines at least one candidate frequency based on locally stored prior historical information includes: The terminal determines a 5G LTE frequency based on the frequency information, where the frequency information includes frequency type information; or the terminal determines a 5G LTE frequency based on the cell information, where the cell information includes cell type information.

In a possible implementation, the preferred condition includes: An energy scanning result of the preferred frequency is greater than or equal to a first threshold; or a difference between an energy scanning result corresponding to a candidate frequency with a largest energy scanning result and an energy scanning result corresponding to the preferred frequency is less than or equal to a second threshold.

In a possible implementation, the processing module is specifically configured to obtain a cell search result of the preferred frequency, where the cell search result includes cell identity information and a cell measurement result corresponding to the cell identity information; and determine a preferred cell based on the prior historical information, the cell identity information, and the corresponding cell measurement result, and camp on the preferred cell; and the preferred cell is a 5G anchor cell that meets the camping condition.

In a possible implementation, the camping condition includes: The cell measurement result of the preferred cell is optimal in the obtained cell measurement results; or a difference between the cell measurement result of the preferred cell and the obtained optimal value of the cell measurement result is less than or equal to a third threshold.

In a possible implementation, if the serving cell on which the terminal camps is a non-5G anchor cell, the processing module is further configured to obtain a system message of a neighboring cell, where the system message includes identity information of the neighboring cell and cell type information corresponding to the identity information of the neighboring cell; and the processing module is further configured to correspondingly write the identity information of the neighboring cell and the cell type information into prior historical information; and the neighboring cell is a cell configured on a network side, or the neighboring cell is a cell from which the terminal can receive the system message.

In a possible implementation, the cell type information is included in a system message SIB2 of a neighboring cell.

According to a seventh aspect, an embodiment of this application provides a computer readable medium, configured to store a computer program, where the computer program includes an instruction used to perform the method according to the first aspect or any possible implementation of the first aspect.

According to an eighth aspect, an embodiment of this application provides a computer readable medium, configured to store a computer program, where the computer program includes an instruction used to perform the method according to the second aspect or any possible implementation of the second aspect.

According to a ninth aspect, an embodiment of this application provides a computer program, where the computer program includes an instruction used to perform the method according to the first aspect or any possible implementation of the first aspect.

According to a tenth aspect, an embodiment of this application provides a computer program, where the computer program includes an instruction used to perform the method according to the second aspect or any possible implementation of the second aspect.

According to an eleventh aspect, an embodiment of this application provides a chip, where the chip includes a processing circuit and a transceiver pin. The transceiver pin and the processing circuit communicate with each other by using an internal connection channel, and the processing circuit performs the method according to any one of the first aspect or the possible implementations of the first aspect, so as to control a receiving pin to receive a signal and control a transmitting pin to send a signal.

According to a twelfth aspect, an embodiment of this application provides a chip, where the chip includes a processing circuit and a transceiver pin. The transceiver pin and the processing circuit communicate with each other by using an internal connection channel, and the processing circuit performs the method according to any one of the possible implementations of the first aspect or second aspect, so as to control a receiving pin to receive a signal and control a transmitting pin to send a signal.

DETAILED DESCRIPTION OF ILLUSTRATIVE EMBODIMENTS

The following clearly and completely describes technical solutions in embodiments of this application with reference to accompanying drawings in the embodiments of this application. Apparently, the described embodiments are some rather than all of the embodiments of this application. Based on the embodiments of this application, all other embodiments obtained by a person of ordinary skill in the art without creative efforts fall within the protection scope of this application.

In this specification, the term "and/or" is only used to describe an association relationship between associated objects, and indicates that three relationships may exist. For example, A and/or B may indicate the following: Only A exists, both A and B exist, and only B exists.

In the specification and claims of this application, the terms "first", "second", "third", "fourth", and the like are intended to distinguish between different objects but do not indicate a particular order of the objects. For example, a first target object and a second target object are used to distinguish between different target objects, and are not used to describe a specific order of the target objects.

In the embodiments of this application, the word such as "example" or "for example" is used to represent giving an example, an illustration, or a description. Any embodiment or design solution described as an "example" or "for example" in the embodiments of this application should not be explained as being more preferred or having more advantages than another embodiment or design solution. Exactly, use of the word "example" or "for example" is intended to present a concept in a specific manner.

In the descriptions of the embodiments of this application, unless otherwise specified, "a plurality of" means two or more than two. For example, a plurality of processing units refer to two or more processing units. A plurality of systems refer to two or more systems; and a plurality of systems refer to two or more systems.

Figure 1:
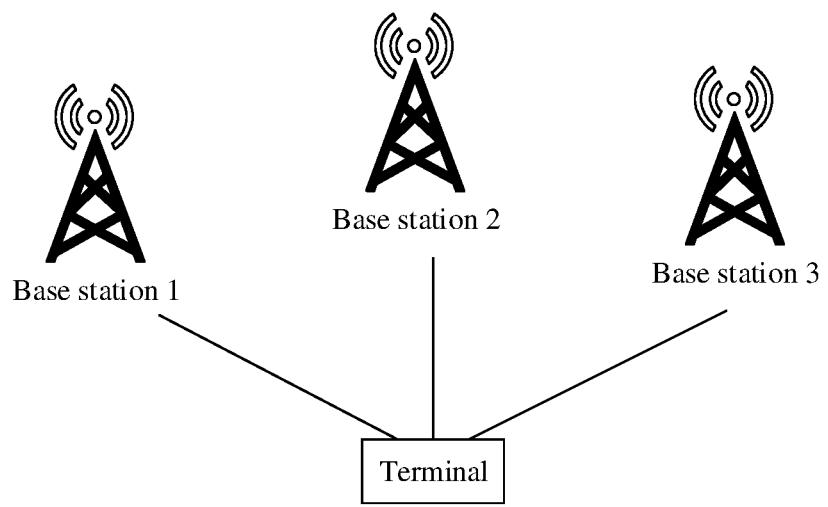
FIG. 1 is a schematic diagram of an example communications system.

Before the technical solutions in the embodiments of this application are described, a communications system of the embodiments of this application is first described with reference to the accompanying drawings. FIG. 1 is a schematic diagram of a communications system according to an embodiment of this application. The communications system includes a base station 1, a base station 2, a base station 3, a base station 4, and a terminal. In a specific implementation process of this embodiment of this application, the terminal may be a device such as a computer, a smartphone, a telephone set, a cable television set-top box, or a digital subscriber line router. It should be noted that in actual application, there may be one or more base stations and terminals. A quantity of base stations and terminals in the communications system shown in FIG. 1 is only an adaptation example. This is not limited in this application.

The communications system may be configured to support a fourth-generation (fourth generation, 4G) access technology, such as a long term evolution (long term evolution, LTE) access technology. Alternatively, the communications system may support a fifth generation (fifth generation, 5G) access technology, such as a new radio (new radio, NR) access technology. Alternatively, the communications system may be configured to support a third generation (third generation, 3G) access technology, such as a universal mobile telecommunications system (universal mobile telecommunications system, UMTS) access technology. Alternatively, the communications system may be configured to support a second generation (second generation, 2G) access technology, such as a global system for mobile communications (global system for mobile communications, GSM) access technology. Alternatively, the communications system may be further configured to support communications systems of a plurality of wireless technologies, for example, support an LTE technology and an NR technology. In addition, the communications system may also be applied to a Narrow Band-Internet of Things (Narrow Band-Internet of Things, NB-IoT), an Enhanced Data rate for GSM Evolution (Enhanced Data rate for GSM Evolution, EDGE) system, a Wideband Code Division Multiple (Wideband Code Division Multiple Access, WCDMA) system, a Code Division Multiple Access 2000 (Code Division Multiple Access, CDMA2000) system, a Time Division-Synchronization Code Division Multiple Access (Time Division-Synchronization Code Division Multiple Access, TD-SCDMA) system, a Long Term Evolution (Long Term Evolution, LTE) system, and a future-oriented communications technology.

The base station in FIG. 1 may be configured to support terminal access. For example, the base station in FIG. 1 may be a base transceiver station (base transceiver station, BTS) and a base station controller (base station controller, BSC) in a 2G access technology communications system, a node B (node B) and a radio network controller (radio network controller, RNC) in a 3G access technology communications system, an evolved nodeB (evolved nodeB, eNB) in a 4G access technology communications system, a next generation nodeB (next generation nodeB, gNB) in a 5G access technology communications system, a transmit and receive point (transmit and receive point, TRP), a relay node (relay node), an access point (access point, AP), or the like. For ease of description, in all the embodiments of this application, apparatuses for providing a wireless communication function for terminals are collectively referred to as network devices or base stations.

The terminal in FIG. 1 may be a device that provides voice or data connectivity to a user, for example, the terminal may also be referred to as a mobile station (mobile station), a subscriber unit (subscriber unit), a station (station), or terminal equipment (terminal equipment, TE). The terminal may be a cellular phone (cellular phone), a personal digital assistant (personal digital assistant, PDA), a wireless modem (modem), a handheld device (handheld), a laptop computer (laptop computer), a cordless phone (cordless phone), a wireless local loop (wireless local loop, WLL) station, a tablet computer (pad), or the like. With development of wireless communications technologies, a terminal in this embodiment of this application may be a device that may access a communications system, may communicate with a network side of the communications system, or may communicate with another object by using the communications system, for example, a terminal or a vehicle in intelligent traffic, a home device in a smart home, a power meter reading instrument in a smart grid, a voltage monitoring instrument, an environment monitoring instrument, a video monitoring instrument in a smart secure network, or a cash register. In this embodiment of this application, the terminal may communicate with a base station, for example, the base station in FIG. 1. A plurality of terminals may communicate with each other. The terminal may be statically fixed or may be mobile.

For example, FIG. 1 shows a schematic structural diagram of a terminal as a mobile phone. The mobile phone 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset interface 170D, a sensor module 180, a key 190, a motor 191, an indicator 192, a camera 193, a display 194, and a subscriber identity module (subscriber identity module, SIM) card interface 195. The sensor module 180 may include a pressure sensor 180A, a gyro sensor 180B, a pressure sensor 180C, a magnetic sensor 180D, an acceleration sensor 180E, a proximity sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the mobile phone 100. In some other embodiments of this application, the mobile phone 100 may include more or fewer components than those shown in the figure, or some components are combined, or some components are split, or a different component arrangement is used. The components shown may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent devices, or may be integrated into one or more processors.

The controller may be a nerve center and a command center of the mobile phone 100. The controller may generate an operation control signal based on an instruction operation code and a time sequence signal, so as to control instruction retrieval and instruction execution.

A memory may also be disposed in the processor 110 to store an instruction and data. In some embodiments, the memory in the processor 110 is a cache memory. The memory may store an instruction or data that is just used or used cyclically by the processor 110. If the processor 110 needs to use the instruction or data again, the instruction or data may be directly invoked from the memory. Repeated access is avoided, and a waiting time of the processor 110 is reduced, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI) interface, a general-purpose input/output (general-purpose input/output, GPIO) interface, a subscriber identity module (subscriber identity module, SIM) interface, a universal serial bus (universal serial bus, USB) interface, and/or the like.

The USB interface 130 is an interface that complies with a USB standard or specification, and may be specifically a Mini USB interface, a Micro USB interface, a USB Type C interface, or the like. The USB interface 130 may be configured to connect to a charger to charge the mobile phone 100, or may be configured to transmit data between the mobile phone 100 and a peripheral device. The interface may also be configured to connect to a headset, so as to play audio by using the headset. The interface may be further configured to connect to another mobile phone, such as an AR device.

It may be understood that the interface connection relationship between the modules shown in this embodiment of this application is merely a schematic description, and does not constitute a limitation on the structure of the mobile phone 100. In some other embodiments of this application, the mobile phone 100 may alternatively use different interface connection manners or a combination of a plurality of interface connection manners in the foregoing embodiment.

The charging management module 140 is configured to receive a charging input from a charger. The charger may be a wireless charger, or may be a wired charger. In some wired charging embodiments, the charging management module 140 may receive a charging input of a wired charger by using the USB interface 130. In some wireless charging embodiments, the charging management module 140 may receive a wireless charging input by using a wireless charging coil of the mobile phone 100. In addition to charging the battery 142, the charging management module 140 may further supply power to the mobile phone by using the power management module 141.

The power management module 141 is configured to connect to the battery 142, the charging management module 140, and the processor 110. The power management module 141 receives an input of the battery 142 and/or an input of the charging management module 140, and supplies power to the processor 110, the internal memory 121, the display 194, the mobile communications module 193, the wireless communications module 160, and the like. The power management module 141 may be further configured to monitor parameters such as a battery capacity, a quantity of battery cycles, and a battery health status (leakage or impedance). In some other embodiments, the power management module 141 may alternatively be disposed in the processor 110. In some other embodiments, the power management module 141 and the charging management module 140 may alternatively be disposed in a same device.

A wireless communications function of the mobile phone 100 may be implemented by using the antenna 1, the antenna 2, the mobile communications module 150, the wireless communications module 160, the modem processor, the baseband processor, and the like.

The mobile phone 100 may implement an audio function (for example, music play or recording) by using the audio module 170, the speaker 170A, the receiver 170B, the microphone 170C, the headset interface 170D, the application processor, and the like.

The audio module 170 is configured to convert digital audio information into an analog audio signal output, and is also configured to convert an analog audio input into a digital audio signal. The audio module 170 may be further configured to encode and decode audio signals. In some embodiments, the audio module 170 may be disposed in the processor 110, or some functional modules of the audio module 170 may be disposed in the processor 110.

The speaker 170A, also referred to as a "loudspeaker", is configured to convert an audio electrical signal into a sound signal. The mobile phone 100 may be used to listen to music or receive a hands-free call by using the speaker 170A.

The receiver 170B is configured to convert an audio electrical signal into a sound signal. When the mobile phone 100 answers a call or a voice message, the receiver 170B may be placed near a human ear to listen to voice.

The microphone 170C is configured to convert a sound signal into an electrical signal. When making a call or sending a voice message, the user may sound by put a mouth near the microphone 170C, and input a sound signal to the microphone 170C. The mobile phone 100 may be provided with one or more microphones 170C. In some other embodiments, the mobile phone 100 may be provided with two microphones 170C, so as to implement a noise reduction function in addition to collecting a sound signal. In some other embodiments, the mobile phone 100 may alternatively be provided with three or more microphones 170C, so as to implement functions such as directional recording and identifying a sound source in addition to collecting a sound signal and reducing noise.

The headset interface 170D is configured to connect to a wired headset. The headset interface 170D may be a USB interface 130, or may be a 3.5 mm open mobile terminal platform (open mobile terminal platform, OMTP) standard interface or a cellular telecommunications industry association of the USA (cellular telecommunications industry association of the USA, CTIA) standard interface.

The mobile phone 100 implements a display function by using the GPU, the display 194, the application processor, and the like. The GPU is a microprocessor for image processing, and is connected to the display 194 and the application processor. The GPU is configured to perform mathematical and geometric calculations to render graphics. The processor 110 may include one or more GPUs that execute a program instruction to generate or change display information.

The display 194 is configured to display an image, a video, and the like. The display 194 includes a display panel. The display panel may be a liquid crystal display (liquid crystal display, LCD), an organic light emitting diode (organic light-emitting diode, OLED), an active matrix organic light emitting diode (active-matrix organic light emitting diode, AMOLED), a flex light-emitting diode (flex light-emitting diode, FLED), a Miniled, a MicroLed, a Micro-oLed, a quantum dot light emitting diode (quantum dot light emitting diode, QLED), or the like. In some embodiments, the mobile phone 100 may include one or N displays 194, where N is a positive integer greater than 1.

The mobile phone 100 may implement a photographing function by using an ISP, a camera 193, a video codec, a GPU, a display 194, an application processor, and the like.

The ISP is configured to process data fed back by the camera 193. For example, during photographing, when a shutter is opened, light is transmitted to the camera photosensitive element by using a lens, an optical signal is converted into an electrical signal, and a photosensitive element of a camera transmits the electrical signal to the ISP for processing, so as to convert the electrical signal into an image visible to a naked eye. The ISP may further perform algorithm optimization on noise, brightness, and a skin color of an image. The ISP may further optimize parameters such as exposure and color temperature of a photographing scene. In some embodiments, the ISP may be disposed in the camera 193.

The camera 193 is configured to capture a still image or a video. An object generates an optical image by using a lens, and the optical image is projected to a photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for conversion into a digital image signal. The ISP outputs the digital image signal to the DSP for processing. The DSP converts the digital image signal into a standard image signal in a format such as RGB or YUV. In some embodiments, the mobile phone 100 may include one or N cameras 193, where N is a positive integer greater than 1.

The digital signal processor is configured to process a digital signal. In addition to processing a digital image signal, the digital signal processor may further process another digital signal. For example, when the mobile phone 100 is selecting a frequency, the digital signal processor is configured to perform Fourier transform on energy of the frequency.

The video codec is configured to compress or decompress a digital video. The mobile phone 100 may support one or more types of video codecs. In this way, the mobile phone 100 may play or record videos in a plurality of coding formats, such as moving picture experts group (moving picture experts group, MPEG) 1, MPEG 2, MPEG3, and MPEG4.

NPU is a neural-network (neural-network, NN) computing processor. By using a biological neural-network structure, for example, by using a transfer mode between human brain neurons, input information is rapidly processed, and self-learning may be performed continuously. Applications such as image recognition, face recognition, voice recognition, and text understanding of the mobile phone 100 may be implemented by using the NPU.

The external memory interface 120 may be configured to connect to an external storage card, such as a Micro SD card, to implement a storage capability of the extended mobile phone 100. The external storage card communicates with the processor 110 by using the external storage interface 120, so as to implement a data storage function. For example, a file such as music or a video is stored in an external storage card.

The internal memory 121 may be configured to store computer executable program code, where the executable program code includes an instruction. The processor 110 performs various functional applications and data processing of the mobile phone 100 by running the instruction stored in the internal memory 121. The internal memory 121 may include a program storage area and a data storage area. The program storage area may store an operating system, an application program required by one or more functions (such as a sound play function or an image play function), or the like. The data storage area may store data (such as audio data or a phone book) created during use of the mobile phone 100. In addition, the internal memory 121 may include a high-speed random access memory, and may also include a non-volatile memory, such as one or more magnetic disk storage devices, a flash memory device, or a universal flash storage (universal flash storage, UFS).

A key 190 includes a power-on key, a volume key, and the like. The key 190 may be a mechanical key, or may be a touch button. The mobile phone 100 may receive a key input, and generate a key signal input related to a user setting or function control of the mobile phone 100.

A motor 191 may generate a vibration prompt. The motor 191 may be configured to provide an incoming call vibration prompt, or may be configured to provide touch vibration feedback. For example, a touch operation performed on different applications (such as photographing and audio playback) may be corresponding to different vibration feedback effects. The motor 191 may also be corresponding to different vibration feedback effects when applied to touch operations in different areas of the display 194. Different application scenarios (such as a time reminder, receiving information, an alarm clock, and gaming) may also be corresponding to different vibration feedback effects. The touch vibration feedback effect may alternatively be customized.

An indicator 192 may be an indicator, and may be used to indicate a charging status, a power change, or may be used to indicate a message, a missed call, a notification, or the like.

A SIM card interface 195 is configured to connect to a SIM card. The SIM card may be inserted into the SIM card interface 195 or removed from the SIM card interface 195, so as to be in contact with or separated from the mobile phone 100. The mobile phone 100 may support one or N SIM card interfaces, where N is a positive integer greater than 1. The SIM card interface 195 may support a Nano SIM card, a Micro SIM card, the SIM card, and the like. A plurality of cards may be inserted into a same SIM card interface 195 at a time. The plurality of cards may be of a same type or different types. The SIM card interface 195 may also be compatible with different types of SIM cards. The SIM card interface 195 may also be compatible with an external storage card. The mobile phone 100 interacts with a network by using the SIM card, so as to implement functions such as calling and data communication. In some embodiments, the mobile phone 100 uses an eSIM card, that is, an embedded SIM card. The eSIM card may be embedded in the mobile phone 100, and cannot be separated from the mobile phone 100.

Based on the communications system shown in FIG. 1, the following briefly describes a background technology used in this application. Specifically:

(1) First, an architecture and functions of the architecture used in this application are briefly described.

a. Non-Stand Alone (Non-Stand Alone, NSA) Network Architecture

Figure 3A:
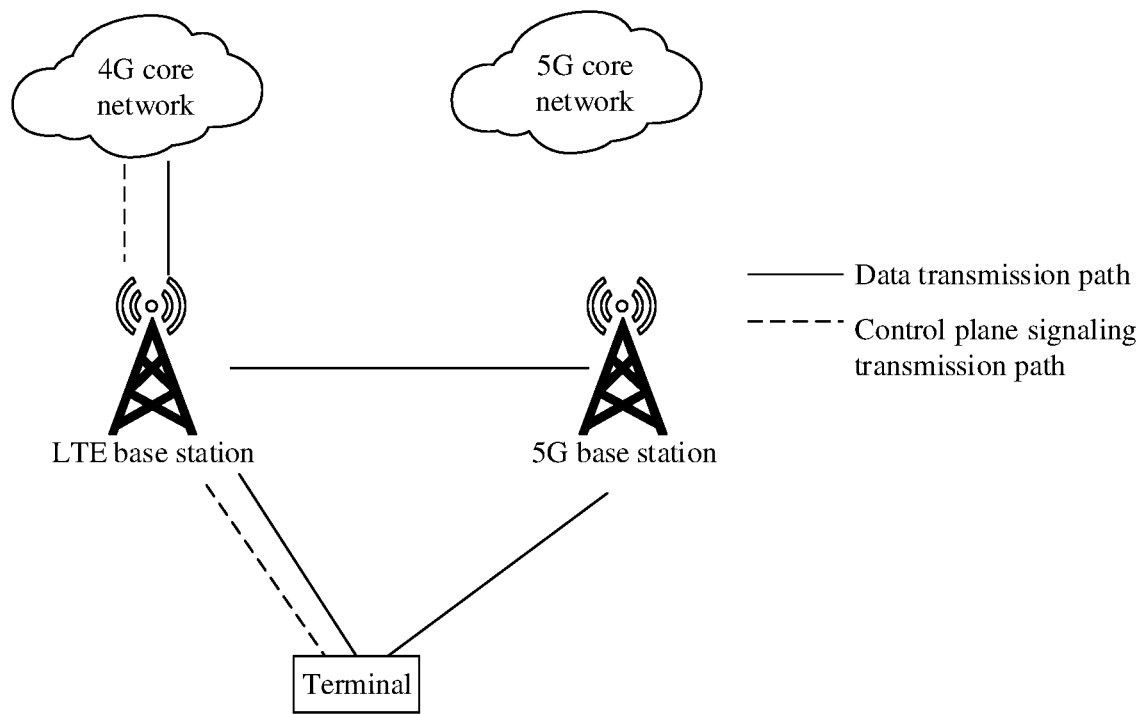
FIG. 3a is a schematic diagram of an example application scenario.

The NSA networking includes an E-UTRA NR Dual Connectivity (E-UTRA NR Dual Connectivity, ENDC) architecture, an NR E-UTRA Dual Connectivity (NR E-UTRA Dual Connectivity, NEDC) architecture, and a Next Generation E-UTRA NR Dual Connectivity (Next Generation E-UTRA NR Dual Connectivity, NGENDC) architecture in a 5G core network. In the ENDC architecture, an eNB is used as a primary base station, and all control plane signaling is forwarded by the eNB. An LTE eNB and an NR gNB provide a user with a high data rate service in a form of dual-connectivity to increase a capacity and a throughput of a system. FIG. 3a is a schematic diagram of an application scenario in an ENDC architecture. In this scenario, all control plane signaling is forwarded by an eNB, and the eNB offloads data to a gNB.

Figure 3B:
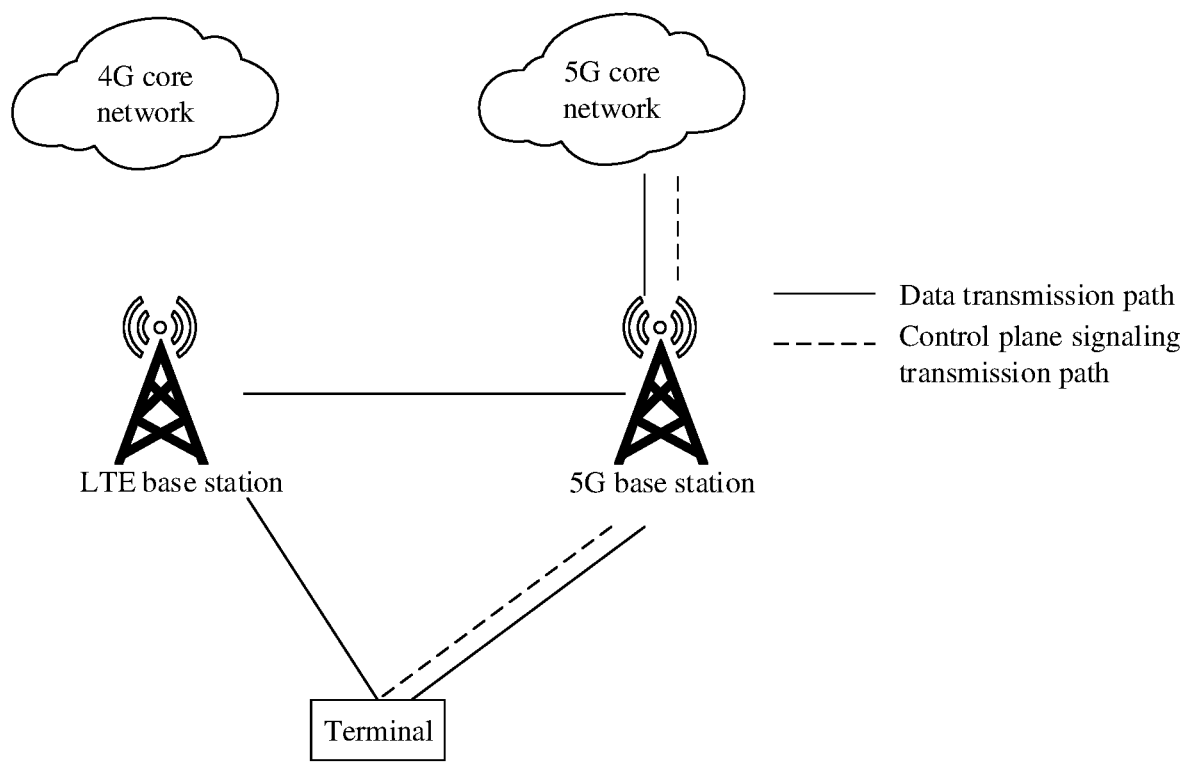
FIG. 3b is a schematic diagram of an example application scenario.

In the NEDC architecture, a gNB is used as the primary base station, and the LTE eNB and NR gNB provide a user with a high data rate service in a form of dual-connectivity. FIG. 3b is a schematic diagram of an application scenario of an NEDC architecture. In this scenario, all control plane signaling is forwarded by a gNB, and the gNB offloads data to an eNB.

Figure 3C:
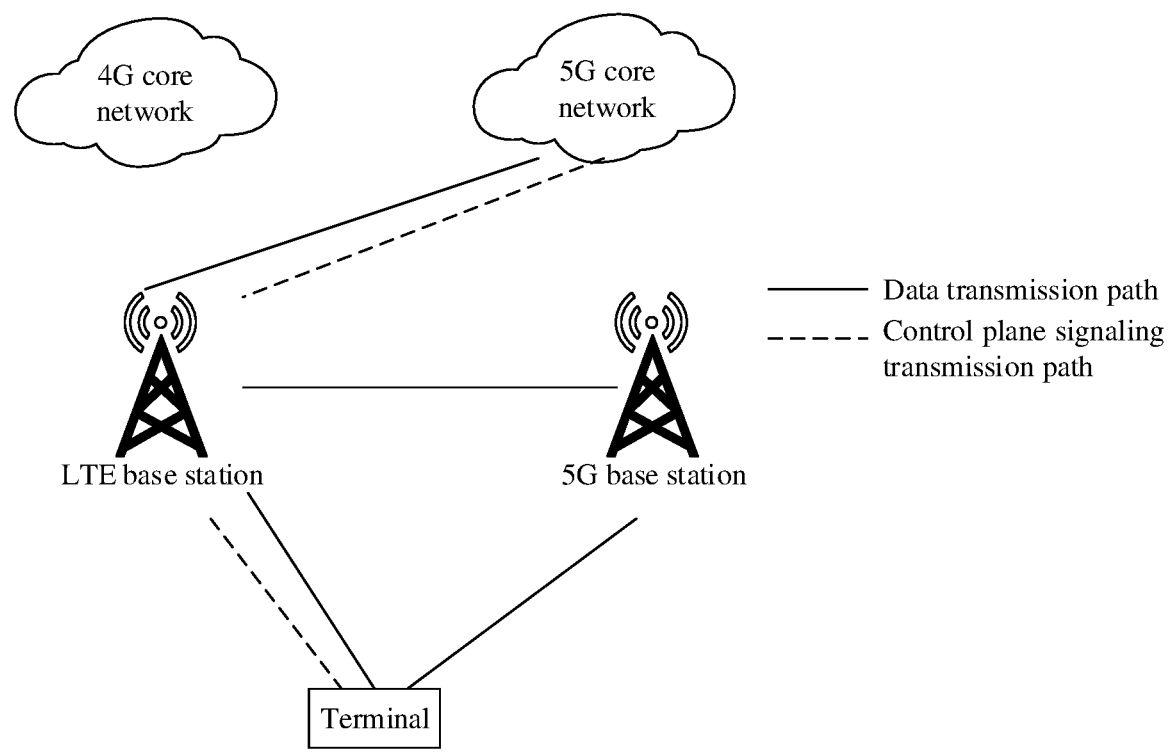
FIG. 3c is a schematic diagram of an example application scenario.

In the NGENDC architecture, all control plane signaling is forwarded by an eNB, and an LTE eNB and an NR gNB provide a user with a high data rate service in a form of dual-connectivity. FIG. 3c is a schematic diagram of an application scenario in an NEDC architecture. In this scenario, all control plane signaling is forwarded by an eNB, and the eNB offloads data to a gNB.

b. Anchor Cell

A primary base station in each dual-connectivity scenario is an anchor base station, a cell that is under the anchor base station and that is configured as a primary cell is referred to as an anchor cell. Optionally, in an ENDC scenario, a 5G cell is used as a secondary cell. Therefore, although the primary cell is an LTE cell, the primary cell may be referred to as a 5G anchor cell.

c. 5G LTE Frequency

The 5G LTE frequency refers to a frequency whose cells include a 5G anchor cell. It should be noted that the 5G LTE frequency may include one or more cells, and the one or more cells include at least one 5G anchor cell. That is, the 5G LTE frequency may include one or more 5G anchor cells, or include one or more 5G anchor cells and one or more non-5G anchor cells.

With reference to FIG. 1, the following briefly describes cell selection manners in different scenarios in the prior art. Specifically:

(1) Network Search Scenario

For example, in a network search scenario, a terminal may perform energy scanning on a historical frequency based on a stored historical frequency, so as to determine whether a cell exists at each historical frequency, that is, if a frequency has an energy value, a cell exists at the frequency, or if a frequency does not have an energy value, no cell exists at the frequency. It should be noted that the historical frequency is a frequency on which the terminal has previously camped, or a frequency on which the terminal has previously searched or measured in a cell search or cell measurement process.

Then, the terminal may sort frequencies based on obtained energy values of the historical frequencies in ascending order, and perform a cell search based on an order of a queue. In this case, if the cell search performed on the first frequency of the queue succeeds, the terminal may attempt to camp on any cell at the frequency.

That is, in a cell network search process, the terminal performs a sequential search based on an energy value of a frequency, and the terminal preferentially performs a cell search on a frequency with an optimal energy scanning result (that is, a maximum energy value). If the cell search succeeds, the terminal may select a cell at the frequency as a serving cell and camp on the cell.

In this scenario, if an energy value of an LTE frequency (that is, a frequency that does not include a frequency of a 5G anchor cell) is greater than an energy value of a 5G LTE frequency, a location of an LTE frequency in a sequence comes before a 5G LTE frequency, and if an LTE frequency is in a first position of a queue and a cell search process succeeds, the terminal may camp on an LTE cell at the LTE frequency. However, actually, the 5G anchor cell can provide a better service for the terminal. For example, compared with a non-5G anchor cell, the 5G anchor cell may provide a 5G service for the terminal, that is, a data transmission rate is greater than a data transmission rate in the non-5G anchor cell.

(2) Reselection Scenario

For example, in a reselection scenario, the terminal may perform cell measurement based on a frequency configured on the network side. Specifically, after obtaining a measurement result of the frequency, the terminal enters an evaluation stage, that is, evaluates the measurement result of the frequency, so as to determine whether a subsequent reselection process may be performed on the frequency. It should be noted that in an evaluation stage, predetermined evaluation duration is set for each frequency. Each time the terminal obtains a measurement result of one frequency, the terminal starts to evaluate the frequency. That is, a frequency whose measurement result may be first obtained may be first evaluated, and when the evaluation succeeds, the terminal may attempt to camp on any cell at the frequency.

In conclusion, in the reselection scenario, the terminal preferentially performs a subsequent reselection operation on a frequency that meets an evaluation criterion and whose evaluation is first completed, that is, the terminal may camp on a cell at the frequency. Optionally, in an evaluation process, if a measurement result of a non-5G LTE frequency meets an evaluation criterion and the evaluation of a non-5G LTE frequency is first completed, the terminal may camp on a non-5G anchor cell at the non-5G LTE frequency. Optionally, if the evaluation of the 5G LTE frequency is first completed in an evaluation process, but the 5G LTE frequency does not meet an evaluation criterion, the terminal may still camp on a non-5G anchor cell that is at a non-5G LTE frequency and whose evaluation is completed after the 5G LTE frequency. That is, whether the evaluation succeeds or not and the sequence of completion of the evaluation affects the probability that the 5G anchor cell is selected as a serving cell.

However, actually, the 5G anchor cell can provide a better service for the terminal. For example, compared with a non-5G anchor cell, the 5G anchor cell may provide the 5G service for the terminal, that is, a data transmission rate is greater than a data transmission rate in the non-5G anchor cell.

(3) Handover Scenario

For example, in a handover scenario, the terminal may perform cell measurement based on the frequency configured on the network side. Specifically, after obtaining the measurement result of the frequency, the terminal enters an evaluation stage, that is, evaluates the measurement result of the frequency, so as to determine whether a subsequent reselection process may be performed on the frequency. As with the reselection scenario, in an evaluation phase, predetermined evaluation duration is set for each frequency. Each time the terminal obtains a measurement result of a frequency, the terminal starts to evaluate the frequency. That is, if the measurement result of a frequency is first obtained, evaluation of the frequency may be first completed; and when the evaluation succeeds, the terminal may report the measurement result of the frequency to the network side. That is, whether the evaluation succeeds or not and the sequence of completion of the evaluation affects the probability that the 5G anchor cell is selected as a serving cell.

In a handover scenario, if the terminal first reports a measurement result of a non-5G LTE frequency, the base station may first consider using a non-5G anchor cell of the frequency as a serving cell of the terminal, and indicate the terminal to hand over to the cell. Apparently, if the terminal can be handed over to the 5G anchor cell, the terminal can obtain a higher data transmission rate than that in the non-5G anchor cell.

To resolve the foregoing problem, in this application, the terminal may optimize an evaluation policy of a frequency (which may be referred to as a preferred frequency) to which a preferred cell belongs, so as to improve a probability that the preferred cell is selected as a serving cell, thereby further improving communication quality of the terminal.

It should be noted that in this application, only an E-UTRA NR dual-connectivity (E-UTRA NR Dual Connectivity, ENDC) scenario in which a 5G anchor cell is used as a preferred cell is used as an example for description. The solution in this application may also be applied when another preferred cell is selected. For example, in an NEDC scenario, a 5G cell is used as an anchor cell, and an LTE cell is used as a secondary cell. That is, the technical solution in this application is also applied to an application scenario in which the 5G cell is used as an anchor cell. This is not limited in this application scenario.

Optionally, in this application, the preferred cell is a cell that is of a specified type or a preset type. Optionally, in this application, the preferred cell is a 5G anchor cell, and a frequency to which the 5G anchor cell belongs may be referred to as an LTE frequency including the 5G anchor cell (5G LTE frequency for short).

Optionally, in this application, the terminal may store prior historical information, and the prior historical information records identity information of one or more frequencies and corresponding cell type information, or identity information of a cell and corresponding cell type information. Optionally, the identity information of the cell includes identity information of a frequency to which the cell belongs, identity information of a frequency band (Band), and a cell identity (that is, a cell ID) of the cell in a base station to which the cell belongs. The frequency type information is used to indicate a type of a frequency, and the cell type information is used to indicate a type of a cell. Specifically, in this application, the frequency includes a frequency of a 5G anchor cell, the frequency type information of the frequency is a 5G LTE frequency, and the cell type information corresponding to the identity information of the 5G anchor cell is a 5G anchor cell.

In a possible implementation, the one or more frequencies or cells recorded in the prior historical information may include a cell on which the terminal camps and a frequency to which the cell belongs. Optionally, after the terminal camps on a cell, the terminal may read system information 2 (SIB2) of the cell to obtain cell type information included in the SIB2. Optionally, the terminal may record, in the prior historical information, only type information of a 5G anchor cell and a frequency to which the 5G anchor cell belongs, and type information of another type of cell and a frequency of the another type of cell may be ignored. Optionally, after the terminal camps on a cell, the cell may be configured as a 5G anchor cell based on a user instruction, that is, a 5G secondary cell is added for the cell. For this type of cell, a type in the prior historical information is also a 5G anchor cell, and a type of a frequency to which the cell belongs is marked as a 5G LTE frequency.

In a possible implementation, one or more frequencies or cells in the prior historical information may include a cell identified in a terminal background search process. A specific process is described in detail in the following embodiments.

Specifically, in this application, the terminal may retrieve the prior historical information based on identity information of a candidate frequency and/or identity information of a candidate cell, so as to determine whether the candidate frequency is a 5G LTE frequency or whether the candidate cell is a 5G anchor cell, that is, the preferred frequency or the preferred cell in this specification. It should be noted that the candidate frequency is a frequency that needs to be performed, and may also be understood as a frequency that may be used as a candidate frequency. The terminal may select a target candidate frequency from candidate frequencies, so as to perform a subsequent cell search, reselection, or handover action. A candidate cell is a cell at a candidate frequency. The candidate frequency may include one or more cells. The target candidate cell is a cell at a target candidate frequency.

Specifically, in this application, the terminal may optimize an evaluation policy of a preferred frequency, so as to improve a probability that a preferred cell at the preferred frequency is selected as a serving cell. Optionally, the evaluation policy includes but is not limited to at least one of the following: a cell search sequence of a frequency, evaluation duration of the frequency, a gain of a cell at the frequency, or a priority of the frequency.

Optionally, in this application, for different application scenarios, the terminal may select different evaluation policies for optimization. The following describes a cell selection manner in different application scenarios in detail with reference to FIG. 1. Specifically, for a cell selection manner in a cell search scenario, refer to scenario 1; for a cell selection manner in a reselection scenario, refer to scenario 2; and for a cell selection manner in a handover scenario, refer to scenario 3.

For example, with reference to FIG. 1, in this application, cells A1-A3 (not shown in the figure) in a base station A are LTE cells, and cells B1-B3 (not shown in the figure) in a base station B are LTE cells, where B1 is a 5G anchor cell of a cell D1 in a base station D. Cells C1-C3 (not shown in the figure) in a base station C are LTE cells, and C1 is a 5G anchor cell of a cell D2 in a base station D. Cells D1-D4 (not shown in the figure) in the base station D are 5G cells, where the cell D1 is a 5G secondary cell of the cell B1. The cell D2 is a 5G secondary cell of the cell C1. For example, in this application, in a option (Option) 3 mode in a dual-connectivity scenario for the cell B1 and the cell D1 and for the cell C1 and the cell D2, an eNB (a base station to which a 5G anchor cell belongs, that is, the base station C or the base station B) provides a control plane connection, and the eNB offloads data to a gNB (a base station to which a 5G cell belongs, that is, the base station D). For example, the cells A1-A3 belong to a frequency 1, the cells B1-B2 belong to a frequency 2, and the cells C1-C3 belong to a frequency 3.

Scenario 1

Figure 4:
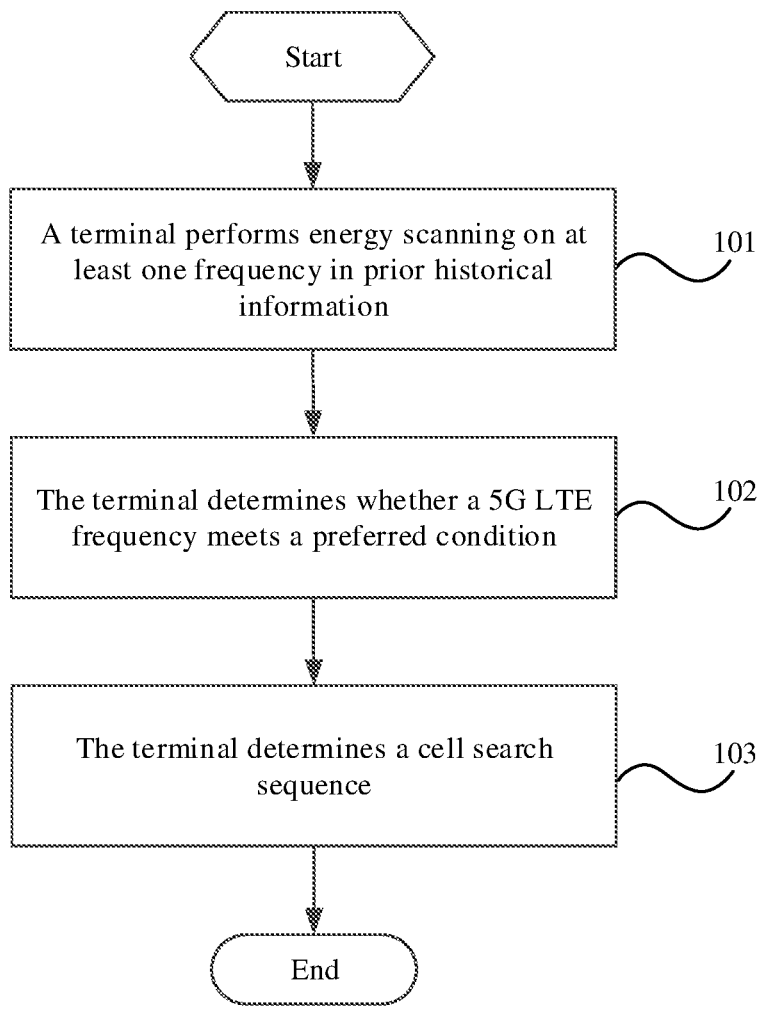
FIG. 4 is a schematic flowchart of a cell selection method according to an embodiment of this application.

With reference to FIG. 1, FIG. 4 is an example schematic flowchart of a cell selection method. Specifically:

Step 101: A terminal performs energy scanning on at least one frequency in prior historical information.

Specifically, in this application, the terminal may retrieve prior historical information locally stored by the terminal, and perform energy scanning based on one or more frequencies recorded in the prior historical information to detect whether energy exists at the frequency. It should be noted that the frequency at which energy exists may be considered as a frequency at a cell exists, and whether a cell actually exists needs to be further determined through cell search.

Further, it should be noted that in this scenario, all frequencies in the prior historical information may be understood as candidate frequencies, and cells at each frequency may be referred to as candidate cells.

Figure 5:
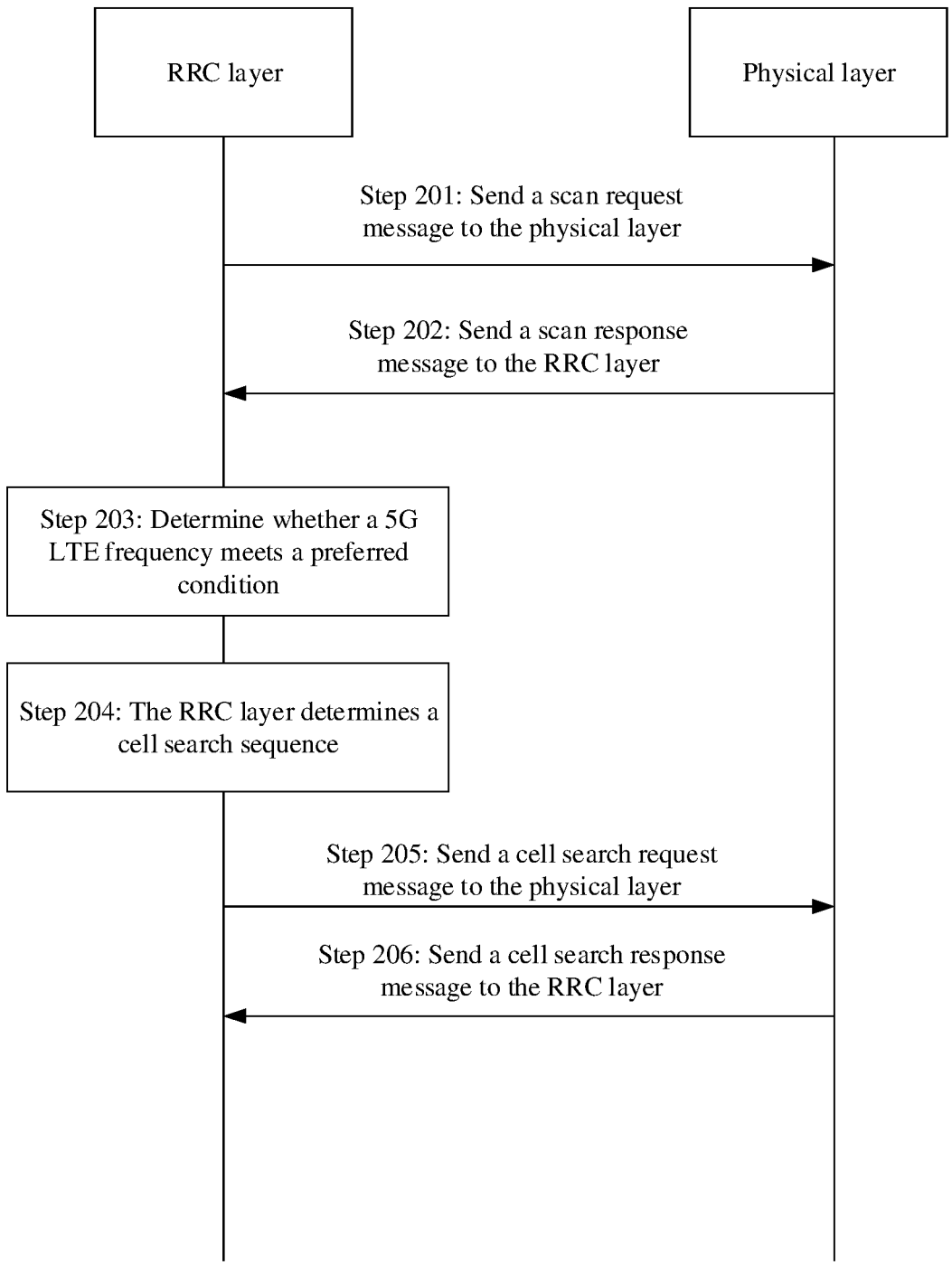
FIG. 5 is a schematic flowchart of a cell selection method according to an embodiment of this application.

FIG. 5 is a specific schematic flowchart of a method for implementing a cell selection method by a terminal. Referring to FIG. 5, a process in which the terminal performs energy scanning may specifically include the following steps:

Step 201: An RRC layer sends a scan request message to a physical layer.

Specifically, after determining that a cell search needs to be performed, a Radio Resource Control (Radio Resource Control, RRC) layer in a terminal extracts prior historical information locally stored in the terminal. As described above, the prior historical information includes identity information of one or more frequencies and/or identity information of a cell.

The RRC layer may indicate the physical layer to measure the energy values of all frequencies recorded in the prior historical information, that is, to perform energy scanning on all the frequencies in the prior historical information.

Specifically, the RRC layer sends the identity information of the frequency to the physical layer, so as to indicate the physical layer to perform energy scanning on the frequency. Optionally, the identity information of the frequency may be carried in a scan request message.

Step 202: The physical layer sends a scan response message to the RRC layer.

Specifically, the physical layer performs energy scanning on corresponding frequencies based on identity information of frequencies indicated by the RRC layer, and sends an energy scanning result to the RRC layer.

Optionally, the physical layer performs energy scanning based on the identity information of the frequencies indicated by the RRC layer one by one, and sends the scanning result of each frequency to the RRC layer after obtaining the energy scanning result.

Optionally, the scanning result may be included in a scanning response message. Optionally, the scanning response message further includes but is not limited to identity information of the frequency, so as to indicate a mapping relationship between the frequency and the energy scanning result.

Optionally, the scanning result includes but is not limited to one or more frequency energy values and/or a cell correlation result. For example, a cell correlation result may be a Primary Synchronization Signal (Primary Synchronization Signal, PSS ratio), and the result is used to indicate a probability that a cell exists at a frequency. For example, the frequency energy value may be Received Signal Strength Indication (Received Signal Strength Indication, RSSI). This is not limited in this application.

Step 102: The terminal determines whether a 5G LTE frequency meets a preferred condition. Optionally, in this application, a preferred condition is set for the terminal. In a cell search scenario, the preferred condition includes but is not limited to at least one of the following:

The energy scanning result of a 5G LTE frequency is greater than or equal to a first frequency threshold (which may be set based on an actual requirement); or a difference between an energy scanning result of a frequency with the largest frequency energy value and an energy scanning result of a 5G LTE frequency is less than or equal to a second frequency threshold (which may be set based on an actual requirement).

It should be noted that in this application, when the energy scanning result of the 5G LTE frequency is greater than or equal to the first frequency threshold, or the difference between the energy scanning result of the 5G LTE frequency and the energy scanning result of the frequency with the largest energy value is less than or equal to the second frequency threshold, the 5G LTE frequency may be considered as a "good frequency", that is, there is a higher probability that a cell exists at the frequency. For example, the first frequency threshold may be −90 dB (relative to the RSSI), and the second frequency threshold may be 10 dB. The first frequency threshold and the second frequency threshold may be specifically set based on an actual requirement. This is not limited in this application.

That is, in this application, if the energy scanning result of the frequency is too poor, for example, is less than the first frequency threshold or has a big difference from the energy scanning result of the first frequency of the queue, the frequency cannot be used as a target candidate frequency to participate in a subsequent cell search process.

Still referring to FIG. 5, specifically, in this application, as shown in FIG. 5:

Step 203: The RRC layer determines whether a 5G LTE frequency meets the preferred condition.

Optionally, as described above, the RRC layer may determine whether the frequency is a 5G LTE frequency by retrieving prior historical information based on the identity information of the frequency. Specifically, the RRC layer may match the identity information of the frequency with one or more frequencies recorded in the prior historical information one by one. If the matching succeeds, a cell type corresponding to the successfully matched frequency is obtained.

In a possible implementation, in this application, the RRC layer may search a plurality of frequencies that meet the foregoing preferred condition for a 5G LTE frequency, so as to determine whether a 5G LTE frequency that meets the preferred condition exists.

In another possible implementation, the RRC layer may further first detect whether a 5G LTE frequency is included in the queue, and then detect whether the 5G LTE frequency meets a preferred condition. Optionally, before step 101, the RRC layer may query, by retrieving the frequency type information of each frequency recorded in the prior historical information, whether the frequencies that need to be scanned includes a 5G LTE frequency. In an example, if a 5G LTE frequency is included, processing is performed by following a procedure in this application. In another example, if no 5G LTE frequency is included, processing is performed by following a network search procedure in the prior art.

It should be noted that if a 5G LTE frequency does not exist in the queue, or a 5G LTE frequency that meets a preferred condition does not exist in the queue, the terminal may camp on a non-5G anchor cell at a non-5G LTE frequency, and perform reselection or handover, or after predetermined duration (which may be set based on a requirement), perform a background search operation (a background search is described in the following embodiments).

Step 103: The terminal determines a cell search sequence.

Specifically, the terminal may determine a current cell search object (that is, a frequency) based on the obtained energy scanning result of each frequency. As described in the prior art above, the terminal performs energy scanning based on a sequence of energy scanning results. That is, cell search is preferentially performed on a frequency with the largest energy scanning result, and a cell at the frequency may be camped on. Compared with the prior art, in this application, if in step 102, the terminal determines that on one or more 5G LTE frequencies that meet a preferred condition are included in the frequencies whose energy scanning results are obtained, in this step, the terminal may determine that the energy scanning sequence of the 5G LTE frequencies that meet the foregoing preferred condition is followed for preferential cell search relative to other frequencies (including the 5G LTE frequencies and/or the LTE frequencies that do not meet the preferred condition). For example, if the terminal obtains the energy scanning result of the frequency 1 and the frequency 2, the frequency 1 is an LTE frequency, the frequency 2 is a 5G LTE frequency, and the energy scanning result of the frequency 1 is greater than the frequency 2. According to the cell search method in the prior art, the terminal preferentially performs a cell search on the frequency 1, and when the frequency 1 meets a condition, camps on an LTE cell at the frequency 1, that is, a non-5G anchor cell. In this application, if an energy scanning result of the frequency 2 meets a specific threshold (that is, a preferred condition described in this application), the terminal preferentially performs a cell search on the frequency 2, and may camp on the 5G anchor cell at the frequency 2.

Still referring to FIG. 5, specifically, step 103 may be performed by an RRC layer in the terminal. Specifically:

Step 204: The RRC layer determines a cell search sequence.

Specifically, the RRC layer receives the scanning response message sent by the physical layer, and reads the identity information of the frequency and the corresponding energy scanning result. Then, the RRC layer may determine a cell search sequence of the frequencies based on the obtained energy scanning result of each frequency.

In a possible implementation, a manner in which the RRC layer determines the cell search sequence may be that the RRC layer may determine a cell search queue, where a 5G LTE frequency that meets a preferred condition is located at a front part of the queue, so as to preferentially perform a cell search operation on the 5G LTE frequency. Optionally, a 5G LTE frequency that meets the preferred condition may be further sorted based on a size of an energy scanning result of each frequency. Optionally, other non-5G LTE frequencies and/or 5G LTE frequencies that do not meet the preferred condition may be sorted based on a scanning result of each frequency.

In another possible implementation, the terminal may determine only an object on which a cell search currently needs to be performed. For example, a cell search rule may be set in the terminal, and a 5G LTE frequency with a largest energy scanning result among the 5G LTE frequencies that meet a preferred condition is determined as the object on which a cell search currently needs to be performed.

Step 104: The terminal performs a cell search based on the cell search sequence.

Specifically, after determining, in step 103, the frequency on which a cell search currently needs to be performed, the terminal may perform a cell search on the frequency to obtain a cell search result of the frequency, where the cell search result includes but is not limited to identity information of each cell at the frequency and a corresponding cell energy measurement result.

Still referring to FIG. 5, in step 104, a process of performing a cell search by the terminal may specifically include:

Step 205: The RRC layer sends a cell search request message to the physical layer.

Specifically, after the frequency on which a cell search currently needs to be performed is determined, the RRC layer may send the identity information of the frequency to the physical layer, so as to indicate the physical layer to perform a cell search on the frequency.

For example, as described in step 204, if a manner of determining a sequence by the RRC layer is determining a cell search queue, a frequency indicated by the RRC layer to the physical layer may be identity information of a frequency that is at the first position in the queue.

Step 206: The physical layer sends a cell search response message to the RRC layer.

Specifically, the physical layer performs, in response to the cell search request message sent by the RRC layer, a cell search on the frequency indicated by the identity information of the frequency, and obtains a cell search result of each cell at the frequency. Optionally, the cell search result includes but is not limited to a cell energy value of each cell at a frequency, and the cell energy value includes but is not limited to reference signal receive power (Reference Signal Receiving Power, RSRP), a signal to interference plus noise ratio (Signal to Interference plus Noise Ratio, SINR), and the like. For a specific cell search process, refer to the prior art. Details are not described in this application.

In a possible implementation, if in step 205, the RRC layer indicates that a frequency on which the cell search is performed by the physical layer is a 5G LTE frequency, in step 206, the physical layer returns a cell search result of each cell at the 5G LTE frequency. The RRC layer may further determine, based on the identity information of each cell, whether the one or more cells at the 5G LTE frequency include a 5G anchor cell by retrieving the identity information of the one or more cells and the corresponding cell type information that are recorded in the prior historical information.

Optionally, if the RRC layer determines, through retrieval, that the cells whose cell search results have been obtained does not include the 5G anchor cell, the reason may be that the cell is not found in a cell search process, or there may be another reason. Optionally, in this case, the RRC layer may indicate the physical layer to attempt to camp on a cell with an optimal cell search result at the frequency, or if a next frequency that needs to be searched in the cell search sequence is still a 5G LTE frequency, the RRC layer may perform a cell search on the next 5G LTE frequency based on the cell search sequence.

Optionally, if the RRC layer determines, through retrieval, that the cells whose cell search results have been obtained includes at least one 5G anchor cell, the RRC layer may further determine whether the 5G anchor cell meets a cell search condition. For example, the cell search condition may be that a cell search result of the 5G anchor cell is optimal among the cells at the same frequency, or a difference between a cell search result of the 5G anchor cell and the optimal cell search result of the cells at the same frequency is less than or equal to a first camping threshold (which may be set based on an actual requirement).

Optionally, if the physical layer fails to attempt to camp on the 5G anchor cell, the RRC layer may again indicate the physical layer to attempt to camp on another 5G anchor cell that meets the cell search condition at a same frequency. Optionally, if no another 5G anchor cell that meets a cell search condition exists at the same frequency, the RRC layer may indicate the physical layer to attempt to camp on another non-5G anchor cell at the same frequency. Optionally, if all cells at the frequency fail to be camped on, the RRC layer may repeat step 205 and step 206, that is, perform a cell search on the next frequency based on a cell search sequence, and attempt to camp on a cell.

In another possible implementation, if in step 205, the RRC layer indicates that a frequency on which a cell search is performed by the physical layer is a non-5G LTE frequency, in step 206, the physical layer returns a cell search result of each cell at the non-5G LTE frequency. The RRC layer may indicate the physical layer to attempt to camp on a cell with an optimal cell search result at the frequency.

In addition, in a possible implementation, if the quantity of frequencies recorded in the prior historical information is less than or equal to a quantity threshold, the RRC layer may not perform an energy scanning process (that is, step 201 and step 202) on the frequencies recorded in the prior historical information, and the RRC layer may detect whether the frequencies in the prior historical information includes a 5G LTE frequency. Optionally, if the RRC layer detects that the frequencies in the prior historical information does not include a 5G LTE frequency, the RRC layer may perform a cell search based on the sequence of the frequencies recorded in the prior historical information. That is, in this embodiment, the cell search sequence determined by the RRC layer is an arrangement sequence of the frequencies in the prior historical information. Optionally, if the RRC layer detects that the frequencies in the prior historical information includes at least one 5G LTE frequency, the RRC layer preferentially performs a cell search on the 5G LTE frequencies based on the cell search sequence determined by the RRC layer.

In conclusion, in a cell search scenario, the RRC layer may adjust the sequence of 5G LTE frequencies that meet a preferred condition, so as to preferentially perform a cell search operation on the 5G LTE frequencies, thereby improving a probability that a 5G anchor cell that may exist at the 5G LTE frequency serves as a serving cell.

Figure 6:
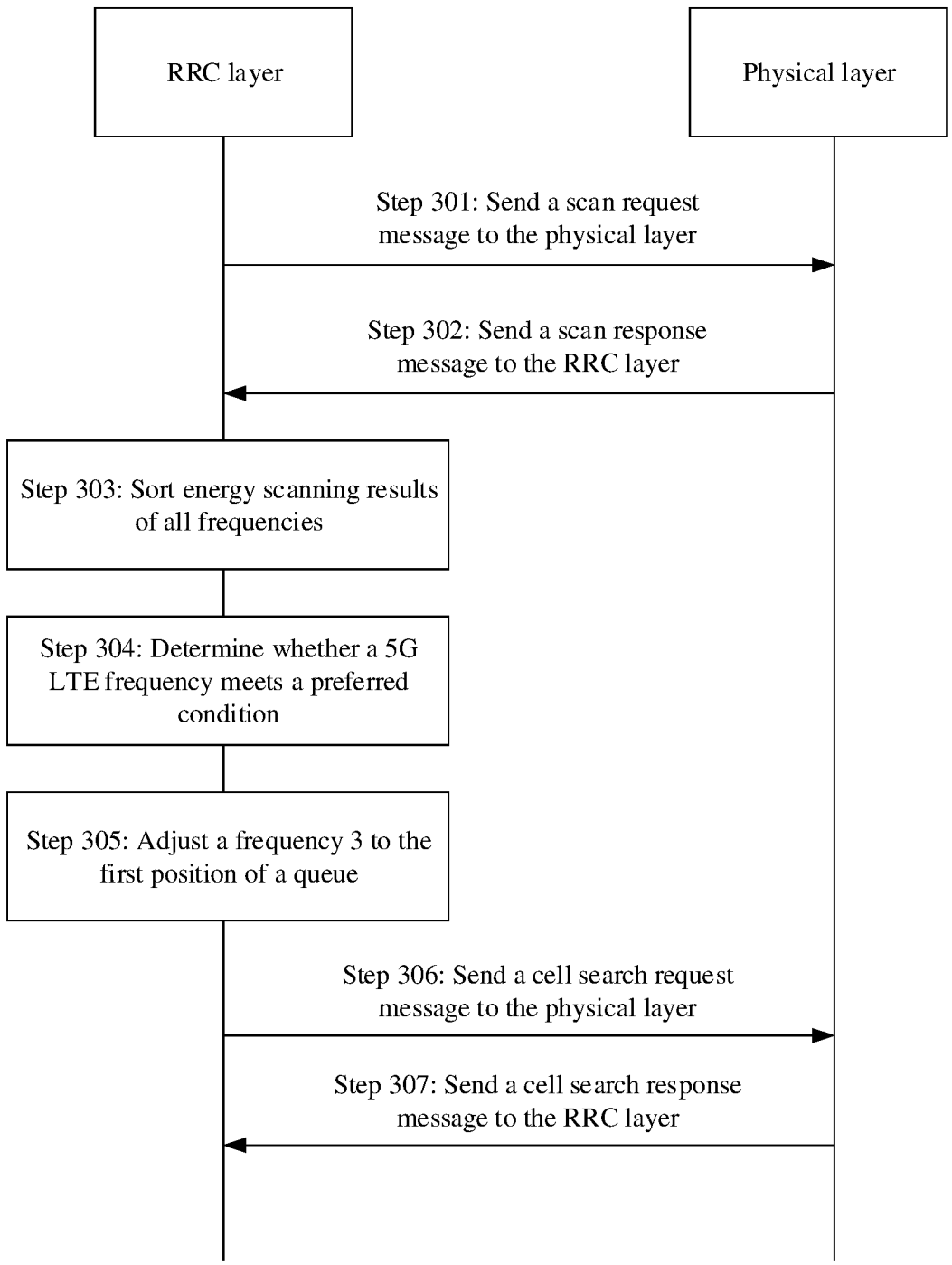
FIG. 6 is a schematic flowchart of a cell selection method according to an embodiment of this application.

With reference to FIG. 1, based on the embodiments shown in FIG. 4 and FIG. 5, FIG. 6 is an example schematic flowchart of a cell selection method. In FIG. 6:

Step 301: An RRC layer sends a scan request message to a physical layer.

Specifically, as described above, the prior historical information includes frequency information (including identity information and frequency type information) and cell information (including a cell identity and cell type information) of at least one frequency. It should be noted that the cell identity may indicate a frequency to which the cell belongs.

In this application, the terminal needs to first perform energy scanning on the frequency. Correspondingly, the RRC layer may obtain, by retrieving the prior historical information, identity information of each frequency recorded in the prior historical information, and indicate the physical layer to perform energy scanning on each frequency.

For example, in this embodiment, the prior historical information is shown in Table 1.

TABLE 1

| Frequency | Frequency type information | Cells at the frequency | Cell type information |
|---|---|---|---|
| Frequency 1 | LTE frequency | Cell A1 | LTE cell |
| | | Cell A2 | LTE cell |
| | | Cell A3 | LTE cell |
| Frequency 2 | 5 G LTE frequency | Cell B1 | 5 G anchor cell |
| | | Cell B2 | LTE cell |
| | | Cell B3 | LTE cell |
| Frequency 3 | 5 G LTE frequency | Cell C1 | 5 G anchor cell |
| | | Cell C2 | LTE cell |
| | | Cell C3 | LTE cell |

It should be noted that the prior historical information shown in Table 1 is only an example. The prior historical information actually records identity information of each frequency and each cell. In Table 1. For example, "frequency 1" may be understood as identity information of a frequency 1; likewise, "cell A1" may be understood as identity information of a cell A1. In actual application, the identity information of the cell includes a combination of a frequency, a frequency band, and a cell ID.

This application imposes no limitation on a manner of recording a correspondence between parameters in the prior historical information and a manner of identifying parameters.

Specifically, the RRC layer retrieves the prior historical information, and obtains identity information (that is, "frequency 1") that includes the frequency 1, the identity information (that is, "frequency 2") that includes a frequency 2, and the identity information (that is, "frequency 3") that includes a frequency 3.

The RRC layer sends a scan request message to the physical layer, where the scan request message carries the frequency 1, the frequency 2, and the frequency 3.

For other specific details, refer to step 201. Details are not described herein again.

Step 302: The physical layer sends a scan response message to the RRC layer.

Specifically, in response to receiving identity information of each frequency, the physical layer performs an energy scanning operation on each frequency.

For example, in this embodiment, the physical layer detects that there is an energy value on each frequency, and returns the energy value to the RRC layer, where the energy value (for example, RSSI) of each frequency is carried in a scanning response message.

For other specific details, refer to step 202. Details are not described herein again.

Step 303: The RRC layer sorts energy scanning results of all frequencies.

For example, the RRC layer sorts RSSI values of all the frequencies in descending order, and a sorting result is as follows:

Frequency 1, frequency 3, and frequency 2.

For other specific details, refer to step 204. Details are not described herein again.

Step 304: The RRC layer determines whether a 5G LTE frequency meets a preferred condition.

For example, based on identity information of each frequency, the RRC layer determines that the frequency 2 and the frequency 3 are 5G LTE frequencies by retrieving the prior historical information.

Further, the RRC layer detects whether RSSI values of the frequency 2 and the frequency 3 are greater than or equal to an RSSI threshold (which may be set based on an actual requirement).

For example, in this embodiment, the RSSI value of the frequency 3 is greater than an RSSI threshold, and the RSSI value of the frequency 2 is less than the RSSI threshold. That is, the frequency 3 is a 5G LTE frequency that meets the preferred condition, and the frequency 2 is a 5G LTE frequency that does not meet the preferred condition.

For other specific details, refer to step 203. Details are not described herein again.

Step 305: The RRC layer adjusts the frequency 3 to the first position of the queue.

For example, an adjusted queue sequence is as follows: frequency 3, frequency 1, and frequency 2.

For other specific details, refer to step 204. Details are not described herein again.

Step 306: The RRC layer sends a cell search request message to the physical layer.

For example, the RRC layer sends the identity information of the frequency (that is, the frequency 3) at the first position of the queue to the physical layer, so as to indicate the physical layer to perform a cell search operation on the frequency 3. The identity information of the frequency 3 is carried in the cell search request message.

For other specific details, refer to step 205. Details are not described herein again.

Step 307: The physical layer sends a cell search response message to the RRC layer.

For example, the physical layer performs a cell search operation on the frequency 3. A specific cell search process includes but is not limited to: The physical layer reads a system message of each cell at the frequency 3, parses the system message, and the like. For specific details, refer to the prior art. Details are not described in this application again.

For example, the physical layer returns a cell search result of the frequency 3 to the RRC layer, and the cell search result is included in the cell search response message.

For example, in this embodiment, the cell search response message may carry identity information of each of the cells C1-C3 and corresponding energy values. After receiving the cell search response message, the RRC layer determines, based on the identity information of each cell, that the cell C1 is a 5G anchor cell by retrieving prior historical information.

Optionally, the RRC layer may further determine whether the cell C1 meets the following conditions:

(1) The cell C1 is the cell with the maximum energy value at the same frequency.
(2) The difference between the energy value of the cell with the maximum energy value and the energy value of the cell C1 is less than or equal to the first camping threshold.

If any one of the foregoing conditions is met, the RRC layer may indicate the physical layer to attempt to camp on the cell C1. On the contrary, if the cell C1 does not meet the foregoing condition, the RRC layer may indicate the physical layer to attempt to camp on a cell with the maximum energy value in the cell C1 and the cell C2. That is, when the energy value of the 5G anchor cell is the maximum value, the terminal may camp on the 5G anchor cell. When the energy value of the 5G anchor cell is not the maximum value, if it is expected that the terminal camps on the 5G anchor cell, considering co-channel interference between the 5G anchor cell and the cell with the maximum energy value, the 5G anchor cell can be used as the serving cell only when a difference between the energy value of the 5G anchor cell and the energy value of the cell with the maximum energy value is less than the first camping threshold. Optionally, if the energy value of the cell includes RSRP, the first camping threshold may be 3 dB; and/or if the energy value of the cell includes an SINR, the first camping threshold may be 3 dB or 5 dB. This may be specifically set based on an actual requirement, and this is not limited in this application.

Scenario 2

Figure 7:
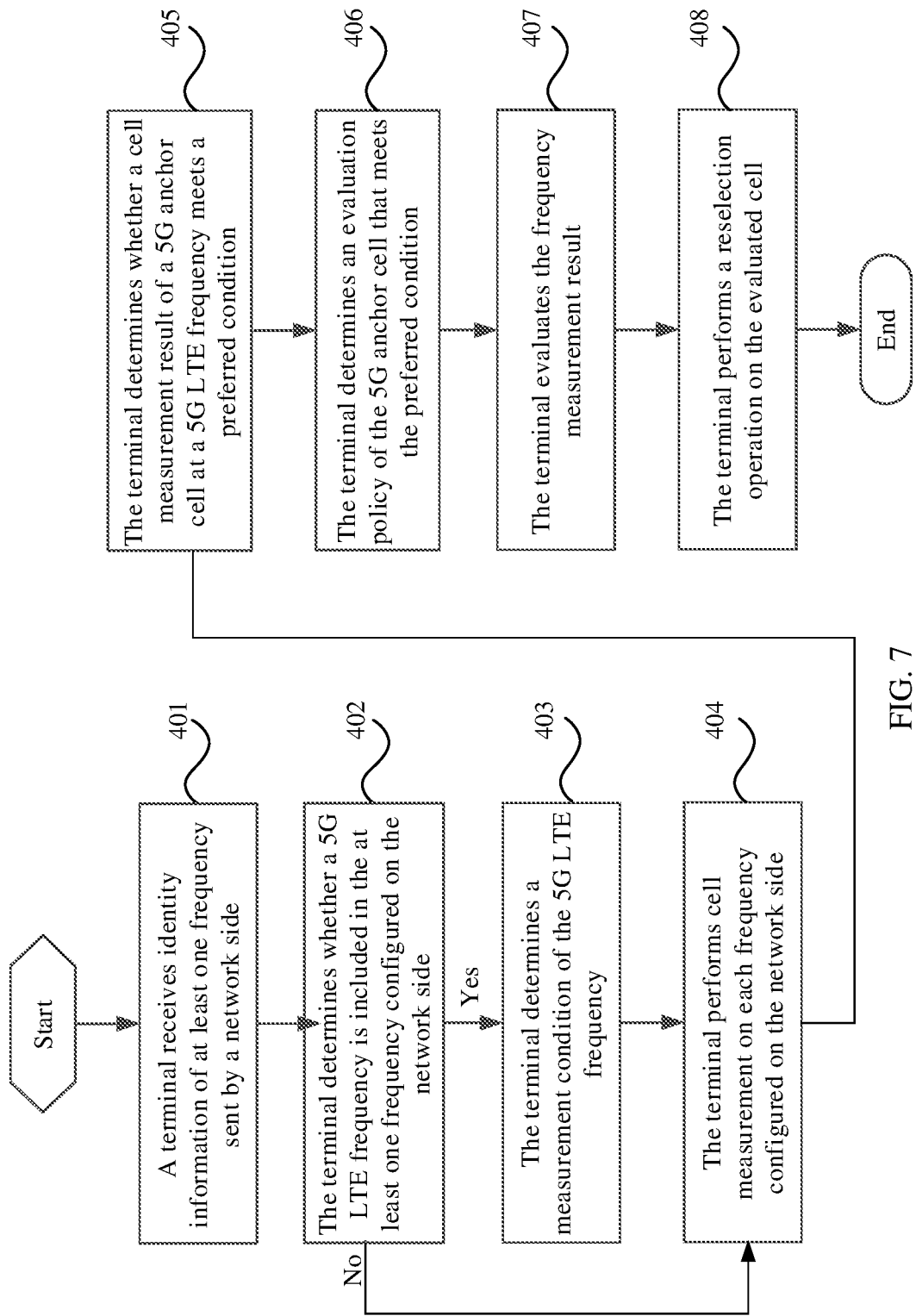
FIG. 7 is a schematic flowchart of a cell selection method according to an embodiment of this application.

With reference to FIG. 1, FIG. 7 shows an example schematic flowchart of a cell selection method. Specifically:

Step 401: A terminal receives identity information of at least one frequency sent by a network side.

Specifically, after camping on the current serving cell, the terminal may perform cell reselection, where the terminal is in an idle state.

Specifically, the network side periodically sends a system message, where the system message includes but is not limited to identity information of at least one frequency (which may also be referred to as a neighboring cell frequency), priority information of each frequency, a measurement threshold, and a reselection threshold.

Specifically, in this application, the RRC layer in the terminal may parse the system message from the network side after the terminal camps on a current serving cell, so as to obtain the identity information of each frequency configured on the network side, priority information of each frequency, the measurement threshold, the reselection threshold, and the like that are included in the system message.

It should be noted that a timer may be set at the RRC layer. After the timer expires, the RRC layer re-parses the system message from the network side. For example, the system message from the network side may be updated. When the RRC layer timer expires, parameters such as identity information and priority information that are of each frequency and that are carried in the new system message are obtained by parsing a new system message from the network side.

Specifically, according to a protocol, in a process in which the terminal performs frequency measurement, a frequency with a high priority needs to be measured. A frequency with the same priority and a frequency with a low priority are measured only when cell quality of service of a serving cell that is currently camped on is less than a measurement threshold. That is, a frequency with a same priority or a low-priority threshold is measured only when the quality of service of the serving cell is less than the measurement threshold. It should be noted that one or more frequencies configured on the network side are candidate frequencies described in this application. It should be noted that quality of service of a cell includes but is not limited to RSRP and/or an SINR of the cell.

Further, it should be noted that a frequency with a high priority means that the priority of the frequency is higher than a priority of a frequency to which a serving cell belongs, a frequency with the same priority means that the priority of the frequency is the same as the priority of the frequency to which the serving cell belongs, and a frequency with a low priority means that the priority of the frequency is lower than the priority of the frequency to which the serving cell belongs.

Step 402: The terminal determines whether a 5G LTE frequency is included in the at least one frequency configured on the network side.

Specifically, after the terminal parses and obtains the identity information of the frequencies in the system message, the terminal matches at least one frequency in the prior historical information with the identity information of each frequency, and obtains the type information corresponding to the matched frequency, so as to determine whether the frequencies configured on the network side includes a 5G LTE frequency. It should be noted that, if a frequency configured on the network side does not match the prior historical information, that is, a frequency configured on the network side is not recorded in the prior historical information, optionally, the frequency may be used as an LTE frequency by default. Optionally, if the frequency is actually a 5G LTE frequency, the terminal may camp on a 5G anchor cell at the 5G LTE frequency, and determine, after reading a system message 2 (the system message 2 carries the cell type) of the frequency, that the cell that is camped on is a 5G anchor cell, and that the frequency to which the cell belongs is a 5G LTE frequency, the RRC layer may update the prior historical information, and write the cell, the frequency to which the cell belongs, and types corresponding to the cell and the frequency into the prior historical information. Optionally, if the terminal does not camp on the cell but camps on an LTE cell at a non-5G LTE frequency, the terminal may obtain, by performing a background search, the type information that are of the 5G anchor cell and the frequency of the 5G anchor cell, and correspondingly write the type information into the prior historical information. A specific process of the background search is described in detail in the following embodiments, and details are not described herein.

Optionally, if the terminal determines that the 5G LTE frequency is included in the frequencies configured on the network side, the terminal may perform step 403, that is, optimize a measurement condition of the 5G LTE frequency. It may also be understood that in this application, after the terminal determines, based on the prior historical information, that a 5G LTE frequency is included in the frequencies configured on the network side, it is determined that the 5G LTE frequency needs to be measured. To ensure that the 5G LTE frequency meets a measurement requirement, the terminal may optimize the measurement condition of the 5G LTE frequency, or modify a measurement policy of the terminal, so that the terminal can measure the 5G LTE frequency. It should be noted that in the prior art, if a 5G LTE frequency does not meet a measurement requirement or a measurement criterion, the 5G LTE frequency is not measured in the prior art, that is, the terminal does not camp on the 5G LTE frequency. In this application, by optimizing the measurement condition of the 5G LTE frequency, a subsequent cell measurement process can also be performed on the 5G LTE frequency that does not meet a measurement condition, thereby improving a possibility that the terminal camps on a 5G anchor cell at the 5G LTE frequency.

Optionally, if the terminal determines that no 5G LTE frequency is included in the frequencies configured on the network side, step 404 is performed to start to measure the frequency. This also be understood as the same as the prior art.

Figure 8:
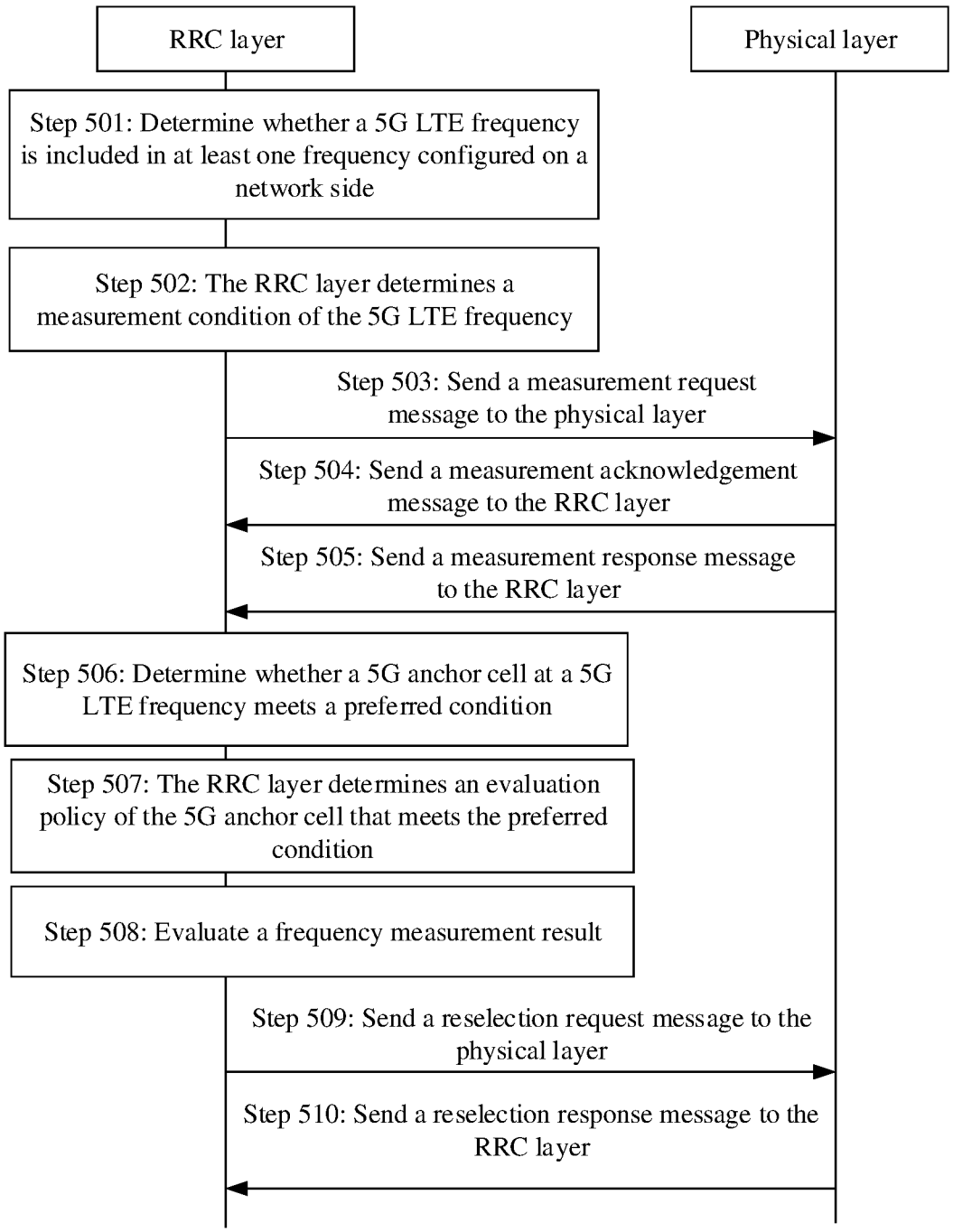
FIG. 8 is a schematic flowchart of a cell selection method according to an embodiment of this application.

FIG. 8 is a schematic flowchart of a method for selecting a cell inside a terminal in a reselection scenario. Referring to FIG. 8, specifically:

Step 501: An RRC layer determines whether a 5G LTE frequency is included in at least one frequency configured on a network side.

Specifically, in this application, the RRC layer may determine, based on identity information of the frequency, whether a 5G LTE frequency is included in the at least one frequency configured on the network side by retrieving frequency type information of each frequency recorded in prior historical information.

If yes, step 502 is performed. If no, step 503 is performed. That is, if no 5G LTE frequency is included in the frequencies configured on the network side, the terminal may camp on a non-5G anchor cell after reselection. In this case, the terminal repeatedly performs step 401, or performs a background search after camping for predetermined duration.

Step 403: The terminal determines a measurement condition of the 5G LTE frequency.

Optionally, in this application, after determining that one or more 5G LTE frequencies are included in the frequencies configured on the network side, the terminal may optimize the measurement condition of the 5G LTE frequency. That is, for a 5G LTE frequency that does not meet the measurement criterion, the terminal may optimize the measurement condition of the 5G LTE frequency, so that the 5G LTE frequency meets the measurement criterion, thereby improving a probability that the 5G LTE frequency is selected as a serving cell.

Specifically, in this application, a process of determining the measurement condition of the 5G LTE frequency may be performed by the RRC layer in the terminal. Still referring to FIG. 8, specifically:

Step 502: The RRC layer determines the measurement condition of the 5G LTE frequency.

Specifically, in this application, the RRC layer measures quality of service of a currently camped serving cell in real time. For a specific measurement process, refer to the prior art. Details are not described in this application again.

Optionally, if the quality of service of the serving cell is higher than a measurement threshold configured on the network side, the terminal performs cell measurement on only a frequency with a high priority that is configured on the network side. In this scenario, if a 5G LTE frequency with a same priority or a low priority exists, the RRC layer may optimize a measurement condition of the 5G LTE frequency, so as to improve a probability that the 5G LTE frequency is selected as the serving cell.

Optionally, the RRC layer may optimize the measurement condition of the 5G LTE frequency in any one of the following optimization manners:

(1) Improving a priority of the 5G LTE frequency. For a 5G LTE frequency with a low priority, a priority of the 5G LTE frequency may be increased, so that the priority of the 5G LTE frequency is greater than a priority of a frequency to which a serving cell belongs, that is, the 5G LTE frequency becomes a frequency with a high priority. For example, if the quality of service of the serving cell is higher than the measurement threshold, the terminal measures only a frequency that is configured on the network side and whose priority is higher than that of a frequency of the serving cell. It is assumed that a priority of a 5G LTE frequency configured on the network side is 5, and a threshold of the serving cell is 4 (a smaller value of a priority indicates a higher priority), that is, a priority of the serving cell is higher than the priority of the 5G LTE frequency, and the 5G LTE frequency is a low-priority frequency. In this case, the RRC layer may improve the priority of the 5G LTE frequency. For example, the priority of the 5G LTE frequency is set to 3, so that the priority of the 5G LTE frequency is higher than the priority of the frequency of the serving cell, and the 5G LTE frequency can participate in a subsequent reselection process.

(2) Modifying a measurement threshold. For example, a threshold is increased. The RRC layer may increase the measurement threshold, so that quality of service of the serving cell is lower than the measurement threshold, so as to trigger measurement of frequencies with a same priority and low priority.

In a possible implementation, after determining the 5G LTE frequency in step 402, the terminal may also perform step 404. That is, after determining that the 5G LTE frequency exists, the terminal may measure the frequencies (which may include the 5G LTE frequency) and the 5G LTE frequency that meet a measurement requirement.

Step 404: The terminal performs cell measurement on each frequency configured on the network side.

Specifically, the terminal may perform cell measurement on a frequency that is configured on the network side and that meets a measurement criterion, that is, measure a cell at the frequency, so as to obtain a frequency measurement result, where the frequency measurement result includes a cell measurement result of at least one cell at the frequency. Optionally, the cell measurement result may include but is not limited to: RSRP, an SINR, and/or the like. This is not limited in this application.

Still referring to FIG. 8, step 404 may specifically include:

Step 503: The RRC layer sends a measurement request message to a physical layer.

Specifically, the RRC layer sends the measurement request message to the physical layer, where the message carries identity information of one or more frequencies.

Optionally, the identity information that is of the one or more frequencies and that is indicated by the RRC layer to the physical layer may include identity information of the at least one 5G LTE frequency.

Step 504: The physical layer sends a measurement acknowledgment message to the RRC layer.

Specifically, after receiving the measurement request message sent by the RRC layer, the physical layer sends the measurement response message to the RRC layer, so as to indicate that the request is successfully received and related configuration is completed.

Step 505: The physical layer sends a measurement response message to the RRC layer.

Specifically, in response to the one or more frequencies sent by the RRC layer, the physical layer performs cell measurement on the one or more frequencies, and obtains a frequency measurement result of each frequency.

Optionally, after obtaining the measurement result of any frequency (including the cell measurement result of each cell at the frequency), the physical layer sends the frequency measurement result of the frequency to the RRC layer, including but not limited to the identity information of the frequency, the identity information of each cell at the frequency, and a corresponding cell measurement result. It should be noted that after obtaining the measurement result of a single frequency, the physical layer may send the measurement result of the frequency to the RRC layer. Optionally, the frequency measurement result of the frequency may be carried in a measurement response message.

For other specific details about cell measurement, refer to the prior art. Details are not described in this application again.

Optionally, in steps 501-503, the RRC layer may determine whether a 5G LTE frequency is included in the frequencies that are indicated for measurement by the physical layer. Optionally, if the 5G LTE frequencies that are indicated by the RRC layer for measurement by the physical layer includes a 5G LTE frequency, after receiving the measurement result sent by the physical layer, step 506 is performed. Optionally, if the 5G LTE frequencies that are indicated by the RRC layer for measurement by the physical layer does not include a 5G LTE frequency, step 508 is performed, that is, a reselection manner in the prior art is still used.

Step 405: The terminal determines whether a cell measurement result of a 5G anchor cell at a 5G LTE frequency meets a preferred condition.

Specifically, as shown in step 506 in FIG. 8, specifically, this step is performed by the RRC layer. Specifically, after receiving a measurement response message sent by the physical layer, the RRC layer obtains identity information of a frequency carried in the measurement response message, identity information of a cell at the frequency, and a corresponding cell measurement result.

Optionally, the RRC layer may determine whether the frequency is a 5G LTE frequency by retrieving the prior historical information based on the received identity information of the frequency. Optionally, if the frequency is not a 5G LTE frequency, step 508 is performed. Optionally, if the frequency is a 5G LTE frequency, it is further determined whether the 5G LTE frequency meets the preferred condition.

Specifically, in this application, the RRC layer determines whether the 5G anchor cell at the 5G LTE frequency meets a preferred condition; and if the 5G anchor cell at the 5G LTE frequency meets the preferred condition, step 507 is performed; or if the 5G anchor cell at the 5G LTE frequency does not meet the preferred condition, step 508 is performed.

Optionally, the preferred condition may include but is not limited to at least one of the following:

5G The cell measurement result of the anchor cell is greater than or equal to the third frequency threshold (which may be set based on an actual requirement); or when the cell measurement result of the 5G anchor cell is less than the measurement result of the serving cell, a difference between the measurement result of the serving cell and the cell measurement result of the 5G anchor cell is less than or equal to a fourth frequency threshold (which may be set based on an actual requirement).

It should be noted that a purpose of a preferred condition is to detect whether the 5G anchor cell can be used as a serving cell, that is, whether the 5G anchor cell is a good cell. Optionally, in this application, a definition of "good cell" is that an RSRP value is greater than −90 dB, and/or an SINR value is greater than 10 dB. Therefore, the third frequency threshold may be that the RSRP value is greater than −90 dB, and/or the SINR value is greater than 10 dB. Optionally, in this application, a cell whose measurement result is less than a measurement result of the serving cell, and a difference between the measurement result and the measurement result of the serving cell (that is, quality of service) is less than or equal to a fourth frequency threshold may be used as a "good cell"; that is, even if the measurement result of the serving cell is less than or equal to a cell measurement result of the 5G anchor cell is less than or equal to a fourth frequency threshold, the 5G anchor cell may still be considered as a "good cell". For example, the fourth frequency threshold may be 5 dB (including RSRP and/or an SINR).

Step 406: The terminal determines an evaluation policy of the 5G anchor cell that meets the preferred condition.

Specifically, after determining that a 5G LTE frequency meets a preferred condition, the terminal may optimize an evaluation policy of the 5G LTE frequency that meets the preferred condition, so as to improve a probability that a 5G anchor cell at the 5G LTE frequency that meets the preferred condition is selected as a serving cell. It should be noted that in this application, the terminal may obtain cell measurement results of the cells at one or more frequencies. Optimization of the evaluation policy described in this application is to optimize a 5G anchor cell that is at a frequency and whose cell measurement result has been obtained. In addition, in this application, optimization of the evaluation policy of a 5G LTE frequency is to optimize the evaluation policy of a 5G anchor cell that is at the 5G LTE frequency and whose cell measurement result has been obtained.

Specifically, as shown in step 507 in FIG. 8, the RRC layer in the terminal determines the evaluation policy of the 5G anchor cell that meets the preferred condition. Optionally, optimization manners of the evaluation policy include:

(1) Shortening evaluation duration of the 5G LTE frequency. Specifically, the system message from the network side further carries evaluation duration, that is, duration set for the evaluation after the RRC layer receives the measurement result of the frequency. After receiving the measurement response message, the RRC layer needs to evaluate the frequency carried in the measurement response message. For example, the evaluation duration may be 300 ms. The RRC layer evaluates the frequency within the evaluation duration. After the evaluation duration ends, and a measurement result of the frequency meets an evaluation criterion, a subsequent reselection procedure is performed. In this application, by shortening evaluation duration of a 5G LTE frequency, the RRC layer may preferentially perform reselection on a cell at the 5G LTE frequency, thereby improving a probability that a 5G anchor cell at the 5G LTE frequency is selected as a serving cell. Optionally, in step 506, the evaluation duration of the frequency corresponding to the 5G anchor cell that meets the preferred condition may be set to first evaluation duration, and the evaluation duration of the 5G LTE frequency or the non-5G LTE frequency that is corresponding to the 5G anchor cell that does not meet the preferred condition may be set to second evaluation duration (that is, the evaluation duration configured on the network side), where the first evaluation duration is less than the second evaluation duration. For example, if the second evaluation duration is 300 ms, the first evaluation duration may be 100 ms. That is, in this embodiment, both the first evaluation duration and the second evaluation duration are fixed values. Optionally, the RRC layer may alternatively dynamically set the evaluation duration of the 5G LTE frequency that meets a preferred condition. For example, if the measurement result currently received by the RRC layer is a non-5G LTE frequency, and the corresponding evaluation duration is the first evaluation duration (300 ms), and the RRC layer receives the measurement result of the 5G LTE frequency after an interval of 20 ms, the RRC layer may increase the evaluation duration of the 5G LTE frequency by at least 20 ms, for example, increase the evaluation duration of the 5G LTE frequency by 30 ms, that is, the evaluation duration of the 5G LTE frequency may be 290 ms. For example, if the RRC layer receives the measurement result of the 5G LTE frequency after an interval of 20 ms, and the measurement result of the 5G LTE frequency is greater than the measurement result of the previous 5G LTE frequency, the RRC layer may further increase the evaluation duration of the 5G LTE frequency, so that the evaluation duration of the 5G LTE frequency is less than the evaluation duration of the previous 5G LTE frequency, for example, increase the evaluation duration of the 5G LTE frequency to 100 ms (relative to the evaluation duration configured on the network side), that is, the evaluation duration is 100 ms. It should be noted that shortening the duration of the 5G LTE frequency is to shorten the evaluation duration of the 5G anchor cell at the 5G LTE frequency.

(2) Increasing the priority of the 5G LTE frequency. Specifically, in this application, reselection thresholds configured on the network side include but are not limited to a high-priority threshold and a low-priority threshold. The high-priority threshold is set for a frequency with a high priority, and the low-priority threshold is set for a frequency with a low priority. For example, if a difference between a gain of a frequency to which the serving cell belongs and a gain of a frequency with a high priority is greater than or equal to a high-priority threshold, it may be determined that the frequency meets the evaluation criterion. For example, if the difference between the gain of the frequency to which the serving cell belongs and the gain of the frequency with a low priority is greater than or equal to a low-priority threshold, it may be determined that the frequency meets the evaluation criterion. The high-priority threshold is lower than the low-priority threshold, that is, a frequency with a high priority is more likely to meet the evaluation criterion. Therefore, in this application, the RRC layer may increase a priority of the frequency with a low priority to convert the frequency to a high-priority frequency, so as to improve a probability that the frequency meets the evaluation criterion. Optionally, a process of increasing a priority may alternatively be performed in an execution process of step 508. That is, when the RRC layer predicts, in an evaluation process, that the 5G LTE frequency may fail to meet the evaluation criterion, a gain and/or a priority may be increased, so as to improve a probability that the 5G LTE frequency meets the evaluation criterion. In addition, if the RRC layer predicts that the 5G LTE frequency can meet the evaluation criterion, a gain and a priority optimization process need not be performed. It should be noted that the high-priority threshold and the low-priority threshold include but are not limited to a RSRP threshold and/or an SINR threshold. For details, reference may be made to the prior art. This is not limited in this application. It should be noted that the priority of the 5G LTE frequency may also be understood as the priority of the 5G anchor cell. Therefore, in this application, increasing the priority of the 5G LTE frequency may also be understood as increasing the priority of the 5G anchor cell.

(3) Increasing a gain of the 5G anchor cell. It should be noted that in the determining process in step 506, when the 5G anchor cell meets the preferred condition in step 506, the gain of the 5G anchor cell may still be lower than a reselection threshold configured on the network side. Correspondingly, the RRC layer may increase the gain of the 5G anchor cell, so that the 5G anchor cell meets the reselection threshold, thereby improving the probability that the 5G anchor cell is selected as a serving cell. It should be noted that the increased gain of the cell of the 5G anchor needs to be controlled within a preset range, for example, the preset range is 1-5 dB, that is, a maximum RSRP value of 5 dB is increased. Optionally, the optimization manner of increasing the gain may be performed in the execution process of step 508. This is not limited in this application.

Optionally, the RRC layer may optimize the evaluation policy of the 5G LTE frequency in any one or more of the foregoing optimization manners. Optionally, because shortening the evaluation duration more significantly increases the probability that the 5G LTE frequency is selected as a target candidate frequency, the RRC layer may preferentially select the manner of shortening the evaluation duration, and combine it with any one or more other optimization manners for optimization.

Step 407: The terminal evaluates the frequency measurement result.

Optionally, in this application, after the terminal obtains the frequency measurement result of any frequency, and determines that the frequency is not a 5G LTE frequency that meets the preferred condition, the terminal may evaluate the frequency measurement result, that is, the obtained cell measurement result of each cell at the frequency, within evaluation duration (configured on the network side) corresponding to the frequency, to determine whether each cell meets the evaluation criterion. It should be noted that if any cell at the frequency meets the evaluation criterion, it may also be considered that the frequency meets the evaluation criterion, that is, the evaluation succeeds; otherwise, if no cell at the frequency meets the evaluation criterion, it may be considered that the frequency does not meet the evaluation criterion, that is, the evaluation fails.

Optionally, if the frequency obtained by the terminal is a 5G LTE frequency that meets a preferred condition, that is, the 5G anchor cell at the 5G LTE frequency meets the preferred condition, and the terminal completes optimization of the evaluation policy of the 5G anchor cell at the 5G LTE frequency, the terminal may evaluate the obtained cell measurement result of each cell at the 5G LTE frequency within the optimized evaluation duration corresponding to the 5G LTE frequency.

Optionally, the evaluation criterion may be: Whether a cell is included in a frequency, whether the cell measurement result of any cell at the frequency meets a reselection threshold, or the like. For specific evaluation details, refer to the prior art. Details are not described herein again.

Specifically, in this application, this step may be performed by the RRC layer in the terminal, as shown in step 508 in FIG. 8.

It should be noted that in an evaluation process, the RRC layer may simultaneously evaluate cell measurement results of cells at a plurality of frequencies. However, the terminal may obtain the frequency measurement results of the frequencies at different time points, and/or the evaluation duration of the frequencies may also be different, that is, the terminal may evaluate the frequencies at different time points and the evaluation duration of the frequencies may not be the same, and therefore, the evaluation end time points of the frequencies may also be different. After completing evaluation on any frequency (which means that the evaluation duration ends and the evaluation criterion is met), the RRC layer may perform a subsequent reselection operation on the frequency, that is, perform step 408.

Step 408: The terminal performs the reselection operation on the evaluated cell.

Specifically, after evaluating any frequency (specifically, the cell measurement result of the cell at the frequency), the terminal may attempt to camp on the cell at the frequency that meets the evaluation criterion, that is, meet the reselection threshold. Optionally, if the terminal fails to camp on any cell at the frequency, the terminal may repeatedly perform step 408, that is, perform the reselection operation on a next evaluated frequency, and attempt to camp on any cell at the next evaluated frequency.

For a specific procedure of the reselection operation, refer to FIG. 8. Specifically:

Step 509: The RRC layer sends a reselection request message to the physical layer.

Specifically, after evaluating any frequency, the RRC layer in the terminal may perform a subsequent reselection process on the cell at the frequency.

In a possible implementation, if the RRC determines, by retrieving the prior historical information, that the current evaluation is completed, or if the evaluated frequency is a 5G LTE frequency, the RRC layer may further determine a 5G anchor cell at the 5G LTE frequency by retrieving the prior historical information based on the identity information of each cell at the 5G LTE frequency, and send a reselection request message to the physical layer, where the message may carry the identity information of the 5G anchor cell, so as to indicate the physical layer to perform subsequent reselection on the 5G anchor cell. An example reselection process performed by the physical layer includes but is not limited to: parsing a system message of the 5G anchor cell, and attempting to camp on the 5G anchor cell.

In another possible implementation, if the RRC determines, by retrieving the prior historical information, that the current evaluation is completed, or that the evaluated frequency is a non-5G LTE frequency, the RRC layer sends a reselection request message to the physical layer, where the message may carry the identity information of the cell at the frequency, so as to indicate the physical layer to perform a subsequent reselection process on the cell. An example reselection process performed by physical layer includes but is not limited to: parsing a system message of the cell, and attempting to camp on the cell. Optionally, the cell to be camped on may be a cell with an optimal cell measurement result at a same frequency.

Step 510: The physical layer sends a reselection response message to the RRC layer.

Specifically, after determining that the terminal successfully camps on the selected serving cell, the physical layer sends the reselection response message to the RRC layer. Optionally, if the camping fails, the physical layer may return a camping failure message to the RRC layer, and wait for the next time the RRC layer indicates a frequency of the camping attempt.

In a possible implementation, if the terminal does not re-select another cell, that is, the terminal still camps on the current serving cell, the terminal may repeatedly perform step 509 to step 510, that is, repeatedly perform a reselection step until the timer expires; and after obtaining the new system message through parsing, the terminal may perform a reselection operation on a frequency configured in the new system message, or until a new serving cell is re-selected.

In conclusion, before the measurement, the RRC layer may optimize a measurement condition of the 5G LTE frequency, so as to improve a probability that a 5G anchor cell that may exist at the 5G LTE frequency is selected as a serving cell. Further, the RRC layer may further improve the probability that the 5G anchor cell is selected as a serving cell by optimizing the evaluation policy of the 5G anchor cell at the 5G LTE frequency.

Figure 9A:
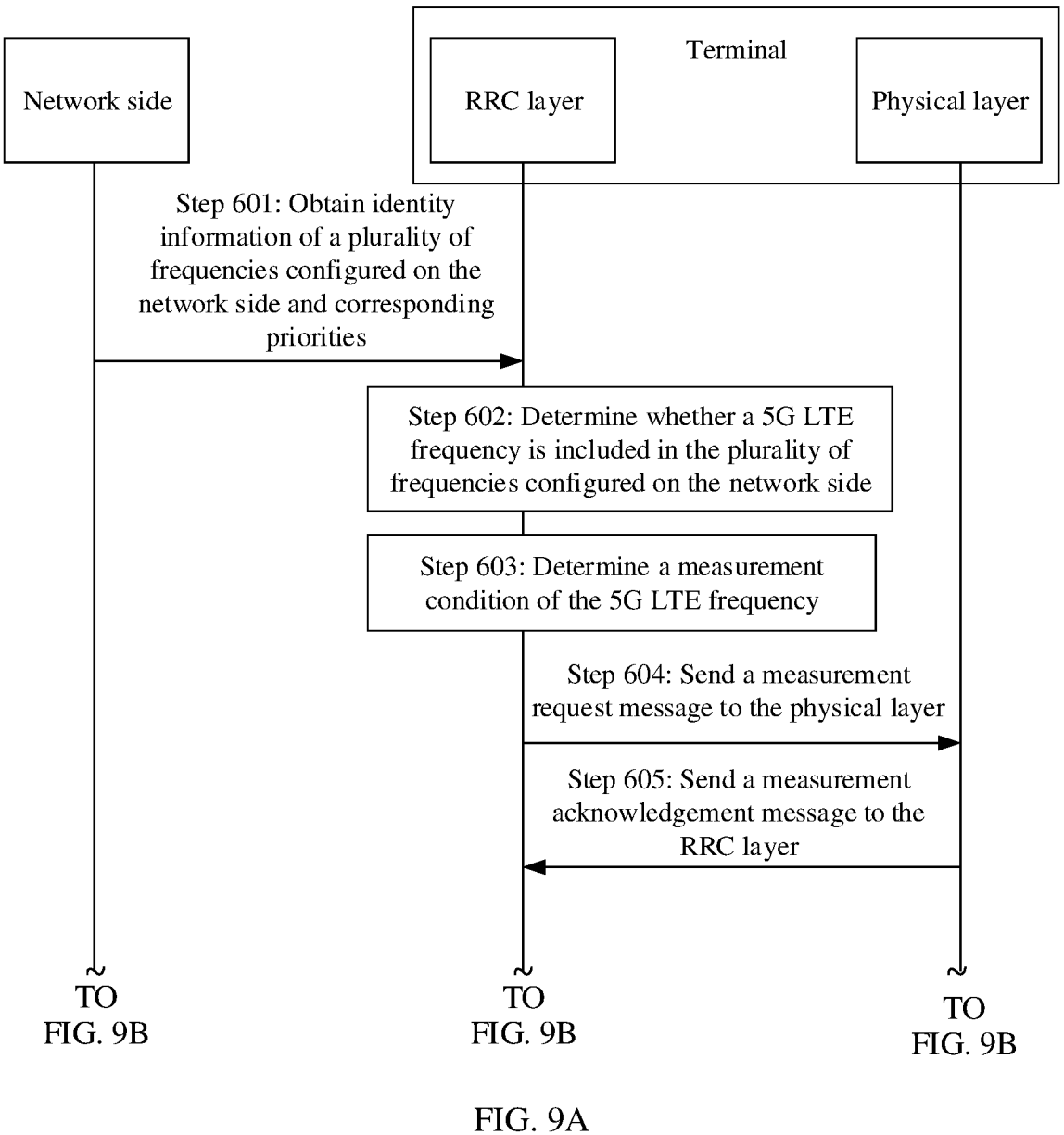
FIG. 9A-FIG. 9B are a schematic flowchart of a cell selection method according to an embodiment of this application.
Figure 9B:
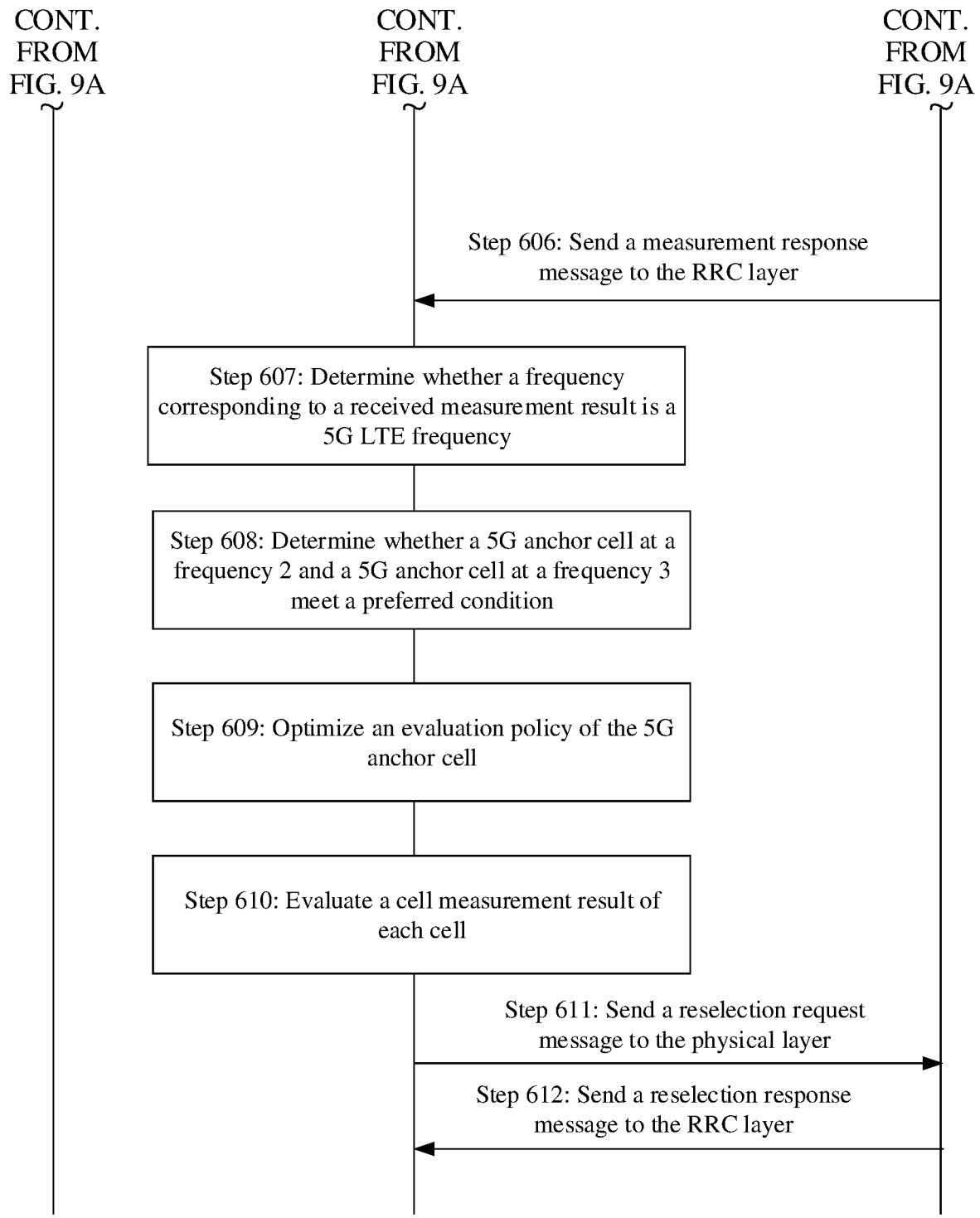

With reference to FIG. 1, based on the embodiments shown in FIG. 7 and FIG. 8, FIG. 9A-FIG. 9B are an example schematic flowchart of a cell selection method. In FIG. 9A-FIG. 9B:

Step 601: An RRC layer obtains identity information of a plurality of frequencies configured on a network side and corresponding priorities.

For example, in this embodiment, the frequencies configured on the network side for the terminal include a frequency 1, a frequency 2, and a frequency 3. The RRC layer obtains the identity information of the frequency 1, a priority 1 of the frequency 1, the identity information of the frequency 2, a priority 2 of the frequency 2, the identity information of the frequency 3, a priority 3 of the frequency 3, a measurement threshold, a reselection threshold, and evaluation duration (300 ms) that are configured on the network side.

Step 602: The RRC layer determines whether a 5G LTE frequency is included in the plurality of frequencies configured on the network side.

For example, in this embodiment, the RRC layer determines that the frequency 2 and the frequency 3 are 5G LTE frequencies.

For other details, refer to scenario 1. Details are not described herein again.

Step 603: The RRC layer determines the measurement condition of the 5G LTE frequency.

For example, in this application, the frequency 2 is a frequency with a high priority (for a concept, refer to the foregoing description), and the frequency 3 is a frequency with a low priority.

For example, in this embodiment, quality of service of the serving cell is greater than a measurement threshold, that is, the terminal performs measurement only on a frequency with a high priority.

For example, in this embodiment, the RRC layer may improve the priority of the frequency 3, so that the priority of the frequency 3 is higher than the priority of the currently camped frequency, that is, optimize the frequency 3 to a cell with a high priority.

Step 604: The RRC layer sends a measurement request message to a physical layer.

For example, in this embodiment, the RRC layer sends a measurement request message to the physical layer when determining that the frequency 1, the frequency 2, and the frequency 3 all meet a measurement condition, that is, all the cells are cells with high priorities, where the message includes but is not limited to identity information of the frequency 1, identity information of the frequency 2, and identity information of the frequency 3.

Step 605: The physical layer sends a measurement acknowledgment message to the RRC layer.

Step 606: The physical layer sends a measurement response message to the RRC layer.

For example, the physical layer measures a cell at each frequency in response to the measurement request message sent by the RRC layer.

Specifically, the physical layer obtains the frequency measurement result of the frequency 1, including the cell measurement result of each of the cells A1-A3. The physical layer sends a measurement response message 1 to the RRC layer, where the message includes: the identity information of the frequency 1, the identity information of the cell A1 at the frequency 1, and a cell measurement result corresponding to the cell A1; the identity information of the cell A2 at the frequency 1, and a cell measurement result corresponding to the cell A2; and the identity information of the cell A3 at the frequency 1, and a cell measurement result corresponding to the cell A3.

Then, the physical layer obtains the frequency measurement result of the frequency 2, including the cell measurement result of each of the cells B1-B3. The physical layer sends a measurement response message 2 to the RRC layer, where the message includes: the identity information of the frequency 2, the identity information of the cell B1 at the frequency 2, and a cell measurement result corresponding to the cell B1; the identity information of the cell B2 at the frequency 2, and a cell measurement result corresponding to the cell B2; and the identity information of the cell B3 at the frequency 2, and a cell measurement result corresponding to the cell B3.

Then, the physical layer obtains that the frequency measurement result of the frequency 3, including the cell measurement result of each of the cells C1-C3. The physical layer sends a measurement response message 3 to the RRC layer, where the message includes: the identity information of the frequency 3, the identity information of the cell C1 at the frequency 3, and a cell measurement result corresponding to the cell C1; the identity information of the cell C2 at the frequency 3, and a cell measurement result corresponding to the cell C2; and the identity information of the cell C3 at the frequency 3, and a cell measurement result corresponding to the cell C3.

Step 607: The RRC layer determines whether a frequency corresponding to the received measurement result is a 5G LTE frequency.

For example, the RRC layer receives the measurement response message 1 sent by the physical layer, and obtains the identity information and other information that are of the frequency 1 and that are carried in the measurement response message 1. If the RRC layer determines, by retrieving the prior historical information based on the identity information of the frequency 1, that the frequency 1 is not a 5G LTE frequency, step 609 is performed.

For example, if the physical layer obtains the frequency measurement result of the frequency 1, and obtains the frequency measurement result of the frequency 2 after an interval of 20 ms, the physical layer sends the frequency measurement result of the frequency 2 to the RRC layer. Correspondingly, after receiving the frequency measurement result (that is, the measurement response message 1) of the frequency 1, after an interval of 20 ms, the RRC layer receives the measurement response message 2 sent by the physical layer, and obtains the identity information and other information that are of the frequency 2 and that are carried in the measurement response message 2. If the RRC layer determines, by retrieving the prior historical information based on the identity information of the frequency 2, that the frequency 2 is not a 5G LTE frequency, step 608 is performed.

For example, after an interval of 20 ms, the RRC layer receives the measurement response message 3 sent by the physical layer, and obtains the identity information and other information that are of the frequency 3 and that are carried in the measurement response message 3. If the RRC layer determines, by retrieving the prior historical information based on the identity information of the frequency 3, that the frequency 3 is not a 5G LTE frequency, step 608 is performed.

Step 608: The RRC layer determines whether a 5G anchor cell at the frequency 2 and a 5G anchor cell at the frequency 3 meet a preferred condition.

For example, both the 5G anchor cell (that is, the cell B1) at the frequency 2 and the 5G anchor cell (that is, the cell C1) at the frequency 3 meet the preferred condition.

For other details, refer to step 507. Details are not described herein again.

Step 609: The RRC layer optimizes the evaluation policy of the 5G anchor cell.

For example, the RRC layer shortens evaluation duration of both the frequency 2 and the frequency 3 to 100 ms. It should be noted that evaluation duration of a non-5G LTE frequency is 300 ms. Both the priority of the frequency 2 and the improved priority of the frequency 3 (refer to step 603) meet a requirement for a high-priority threshold, that is, both the priority of the frequency 2 and the improved priority of the frequency 3 are high priorities. For example, the RRC layer detects that a gain (RSRP and an SINR) in the cell measurement result of a 5G anchor cell (cell B1) at the frequency 2 meets a high-priority threshold, and the cell measurement result (RSRP and an SINR) of a 5G anchor cell (cell C1) at the frequency 3 does not meet the high-priority threshold. The RRC layer may increase the gain (RSRP and the SINR) of the cell C1, so that the gain of the cell C1 meets the high-priority threshold.

Step 610: The RRC layer evaluates the cell measurement result of each cell.

Specifically, after receiving the measurement result of a frequency and determining the evaluation policy of each measurement result, the RRC layer may start to evaluate the measurement result of the frequency, that is, the cell measurement result of each cell at the frequency. For example, the RRC layer first evaluates the measurement result of each cell at the frequency 1, and the evaluation duration is 300 ms. Then, after optimizing the evaluation policy of the frequency 2, the RRC layer evaluates the optimized measurement result of each cell at the frequency 2, and the evaluation duration is 100 ms.

In addition, the RRC evaluates the optimized measurement result of each cell at the frequency 3, and the evaluation duration is 100 ms.

It should be noted that the start time points of measurement of the frequencies are different, which is specifically determined based on the receiving duration and the duration for optimizing the evaluation policy.

Step 611: The RRC layer sends a reselection request message to the physical layer.

For example, in this application, the RRC layer preferentially completes evaluation on the measurement result of each cell at the frequency 2, and the measurement result of each cell at the frequency 2 meets the evaluation criterion. The RRC layer determines that the cell B1 is a 5G anchor cell by retrieving the prior historical information based on the identity information of each cell (cells B1-B3) at the frequency 2.

Optionally, the RRC layer may further determine whether the measurement result of the cell B1 meets a reselection rule. The reselection rule includes:
(1) A measurement result of the cell is optimal (that is, a maximum RSRP and/or a maximum SINR) among all the cells at the same frequency.
(2) A difference between the cell measurement result of the cell and the optimal cell measurement result of the cells at the same frequency is less than or equal to a first camping threshold (which may be set based on an actual requirement, for example, 5 dB).

In this embodiment, the RRC layer has optimized the cell measurement result (that is, the gain) of the cell B1 in step 609. In this step, the optimized cell measurement result of the cell B1 meets the reselection rule, and the RRC layer may determine that the terminal may camp on the cell B1.

The RRC layer sends a reselection request message to the physical layer, where the reselection request message includes the identity information of the cell B1, so as to indicate the physical layer to perform a subsequent reselection operation on the cell B1, for example, to attempt to camp on the cell B1.

For example, if the RRC layer receives a reselection response message sent by the physical layer, the evaluation procedure ends. If the RRC layer receives a reselection failure message, or after the frequency 3 is evaluated, does not receive the reselection response message sent by the physical layer, the RRC layer continues to send, to the physical layer, the reselection request message that carries the identity information of the 5G anchor cell at the frequency 3.

Step 612: The physical layer sends the reselection response message to the RRC layer.

For example, if the terminal successfully camps on the cell B1, the physical layer sends the reselection response message to the RRC layer, and the procedure ends. If the terminal fails to camp on the cell B1, the physical layer sends the reselection failure message to the RRC layer, or does not send any message, and waits for the RRC layer to continue to send identity information of a next evaluated frequency.

Scenario 3

Figure 10:
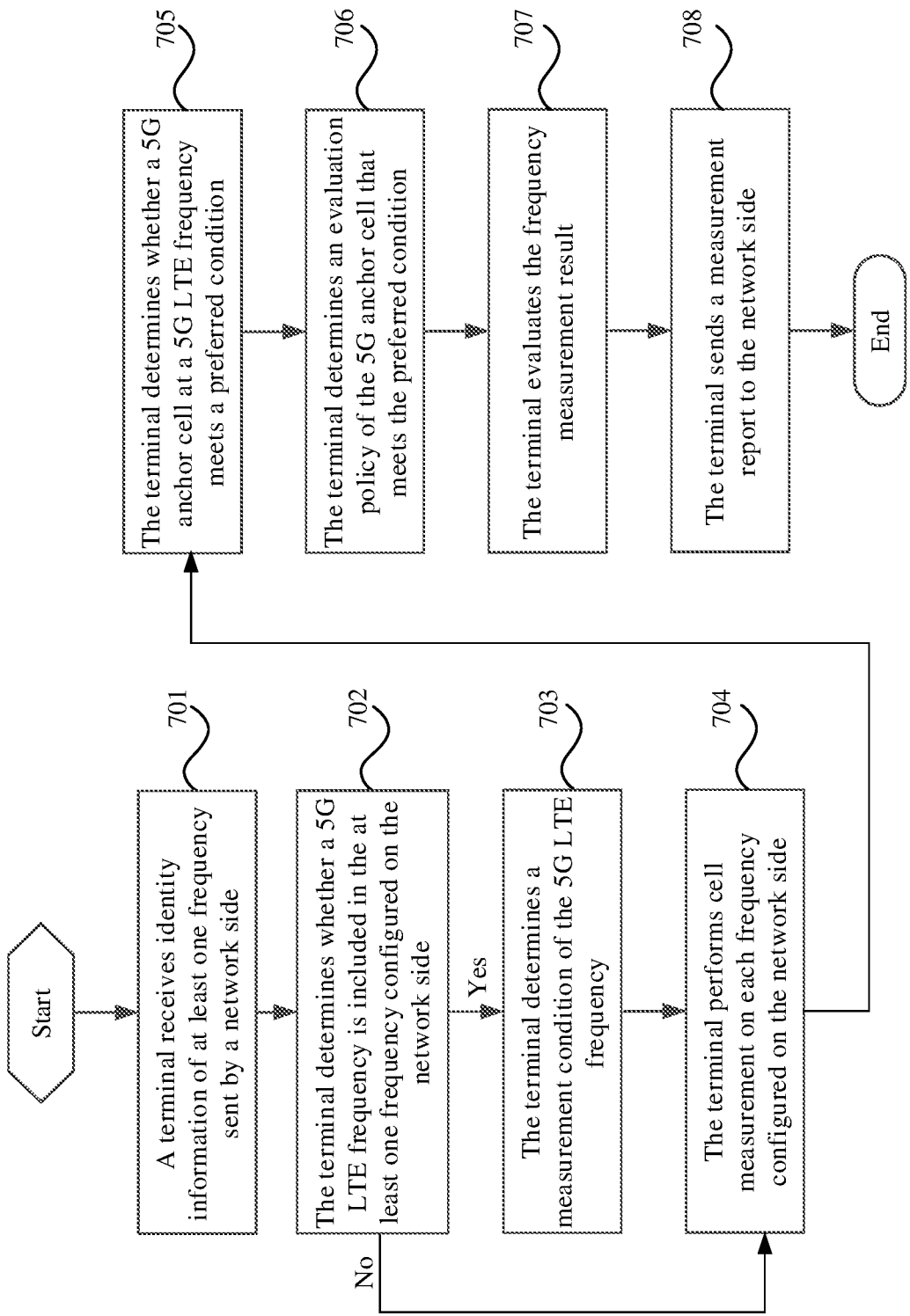
FIG. 10 is a schematic flowchart of a cell selection method according to an embodiment of this application.

With reference to FIG. 1, FIG. 10 is an example schematic flowchart of a cell selection method. Specifically:

Step 701: A terminal receives identity information of at least one frequency sent by a network side.

Specifically, in the connected state, the terminal may receive a configuration message sent by the network side, where the configuration message includes identity information of at least one frequency, a measurement threshold, and a handover threshold.

For specific details, refer to the prior art. Details are not described in this application.

Step 702: The terminal determines whether a 5G LTE frequency is included in the at least one frequency configured on the network side.

For specific details, refer to scenario 2. Details are not described herein again.

Step 703: The terminal determines a measurement condition of the 5G LTE frequency.

Specifically, in a handover scenario, a measurement threshold is configured on the network side. If quality of the serving cell is higher than the measurement threshold, a subsequent procedure does not need to be triggered; or if the quality of the serving cell is lower than the measurement threshold, a subsequent measurement procedure is triggered, that is, step 704 is performed.

Optionally, if the currently camped cell is not a 5G anchor cell, the terminal may increase the measurement threshold, so as to expect the terminal to be handed over to the 5G anchor cell.

It should be noted that step 703 is an optional step, which may not be performed.

This is not limited in this application.

Step 704: The terminal performs cell measurement on each frequency configured on the network side.

For specific details, refer to scenario 2. Details are not described herein again.

Step 705: The terminal determines whether a 5G anchor cell at a 5G LTE frequency meets a preferred condition.

For specific details, refer to scenario 2. Details are not described herein again.

Step 706: The terminal determines an evaluation policy of the 5G anchor cell that meets the preferred condition.

Specifically, in the handover scenario, an optimization manner of the evaluation policy includes:
(1) Shortening the evaluation duration.
(2) Increasing the gain. Specifically, in the handover scenario, a handover threshold is configured on the network side. The terminal may increase the gain of the 5G anchor cell, so that the 5G anchor cell meets the requirement for the handover threshold, thereby meeting the evaluation criterion.

Specific details are similar to those in scenario 2. Details are not described herein again.

Step 707: The terminal evaluates the frequency measurement result.

For specific details, refer to scenario 2. Details are not described herein again.

Step 708: The terminal sends a measurement report to the network side.

Specifically, in this application, after the terminal evaluates the cell measurement result of each cell at a single frequency (that is, the evaluation duration ends, and the evaluation criterion is met), the terminal may send the measurement report to the network side, where the report includes the identity information and the cell measurement result of each cell at the evaluated frequency. That is, the terminal sends the measurement result of the frequency to the network side after the frequency is evaluated. In this application, after the terminal optimizes the evaluation duration of the 5G anchor cell, the cell measurement result of the 5G anchor cell may be preferentially reported. In addition, after the gain of the 5G anchor cell is optimized, a probability that a base station selects the 5G anchor cell as a serving cell may be improved.

In conclusion, in the handover scenario, the terminal may optimize the evaluation policy of the 5G anchor cell at a 5G LTE frequency, so as to improve the probability that the base station selects a 5G anchor cell at a 5G LTE frequency as the serving cell of the terminal.

Figure 11:
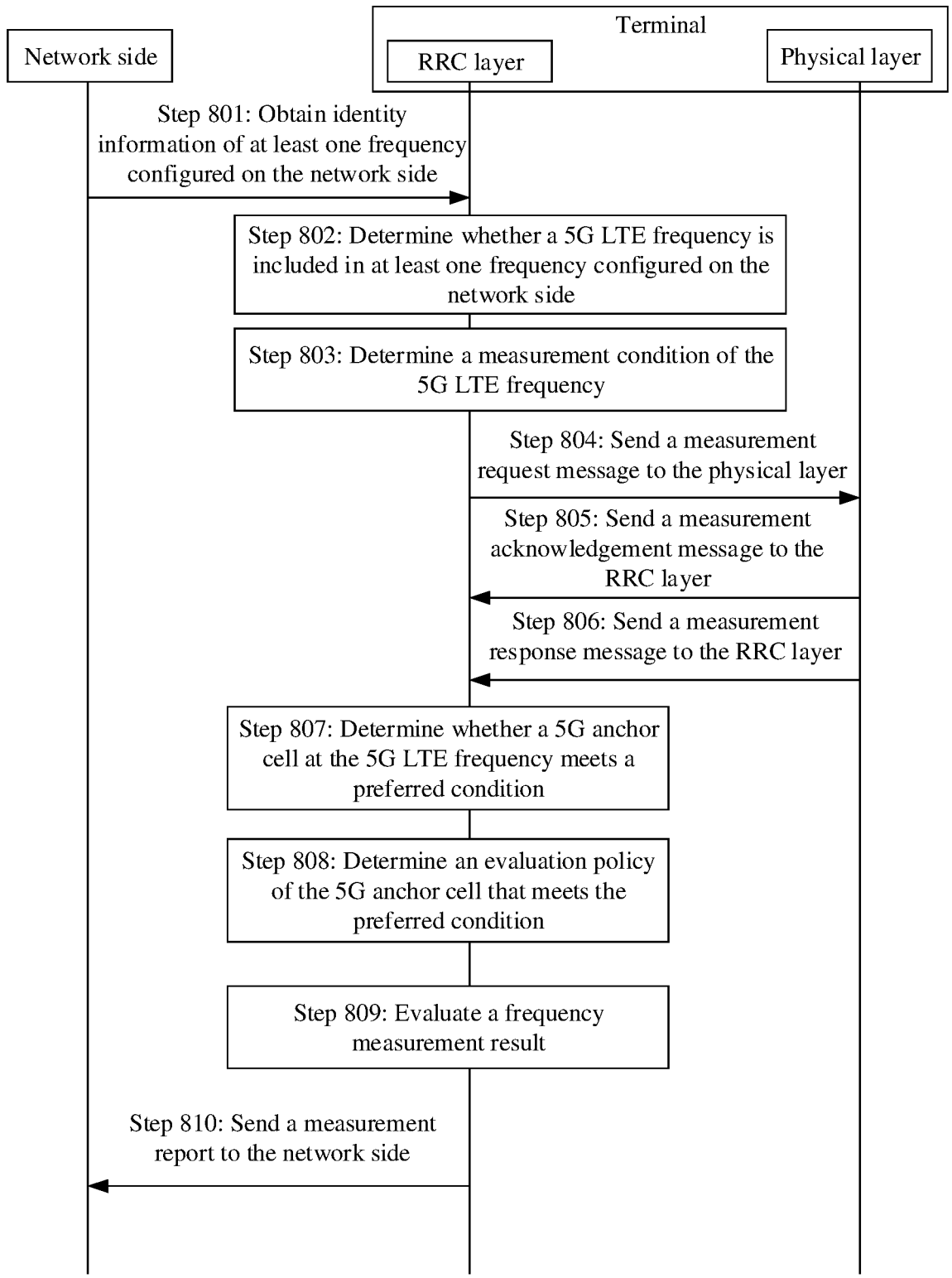
FIG. 11 is a schematic flowchart of a cell selection method according to an embodiment of this application.

Based on the embodiment shown in FIG. 10, FIG. 11 is an example schematic flowchart of a cell selection method. In FIG. 11:

Step 801: An RRC layer obtains identity information of at least one frequency configured on a network side.

For specific details, refer to scenario 2. Details are not described herein again.

Step 802: An RRC layer determines whether a 5G LTE frequency is included in at least one frequency configured on the network side.

For specific details, refer to scenario 2. Details are not described herein again.

Step 803: The RRC layer determines a measurement condition of the 5G LTE frequency.

Specifically, in a handover scenario, a measurement threshold is configured on the network side. If quality of the serving cell is higher than the measurement threshold, a subsequent procedure does not need to be triggered; or if the quality of the serving cell is lower than the measurement threshold, a subsequent measurement procedure is triggered, that is, step 804 is performed.

Optionally, if the currently camped cell is not a 5G anchor cell, the RRC layer may increase the measurement threshold, so as to expect the terminal to hand over to the 5G anchor cell.

It should be noted that step 803 is an optional step, which may not be performed. This is not limited in this application.

Step 804: The RRC layer sends a measurement request message to a physical layer.

For specific details, refer to scenario 2. Details are not described herein again.

Step 805: The physical layer sends a measurement acknowledgment message to the RRC layer.

For example, the message is used to indicate that the physical layer to receive the measurement request message sent by the RRC layer and complete corresponding measurement preparation.

Step 806: The physical layer sends a measurement response message to the RRC layer.

For specific details, refer to scenario 2. Details are not described herein again.

Step 807: The RRC layer determines whether a 5G anchor cell at a 5G LTE frequency meets a preferred condition.

For specific details, refer to scenario 2. Details are not described herein again.

Step 808: The RRC layer determines the evaluation policy of the 5G anchor cell that meets the preferred condition.

Specifically, in the handover scenario, an optimization manner of the evaluation policy includes:

(1) Shortening the evaluation duration.

(2) Increasing the gain.

For specific details, refer to scenario 2. Details are not described herein again.

Step 809: The RRC layer evaluates the frequency measurement result.

For specific details, refer to scenario 2. Details are not described herein again.

Step 810: The RRC layer sends a measurement report to the network side.

Specifically, in this application, after the RRC layer completes evaluation on a single frequency, and the frequency meets an evaluation criterion, the RRC layer may send the measurement report to the network side, where the report includes the identity information and the cell measurement result of each cell at the frequency.

Figure 12:
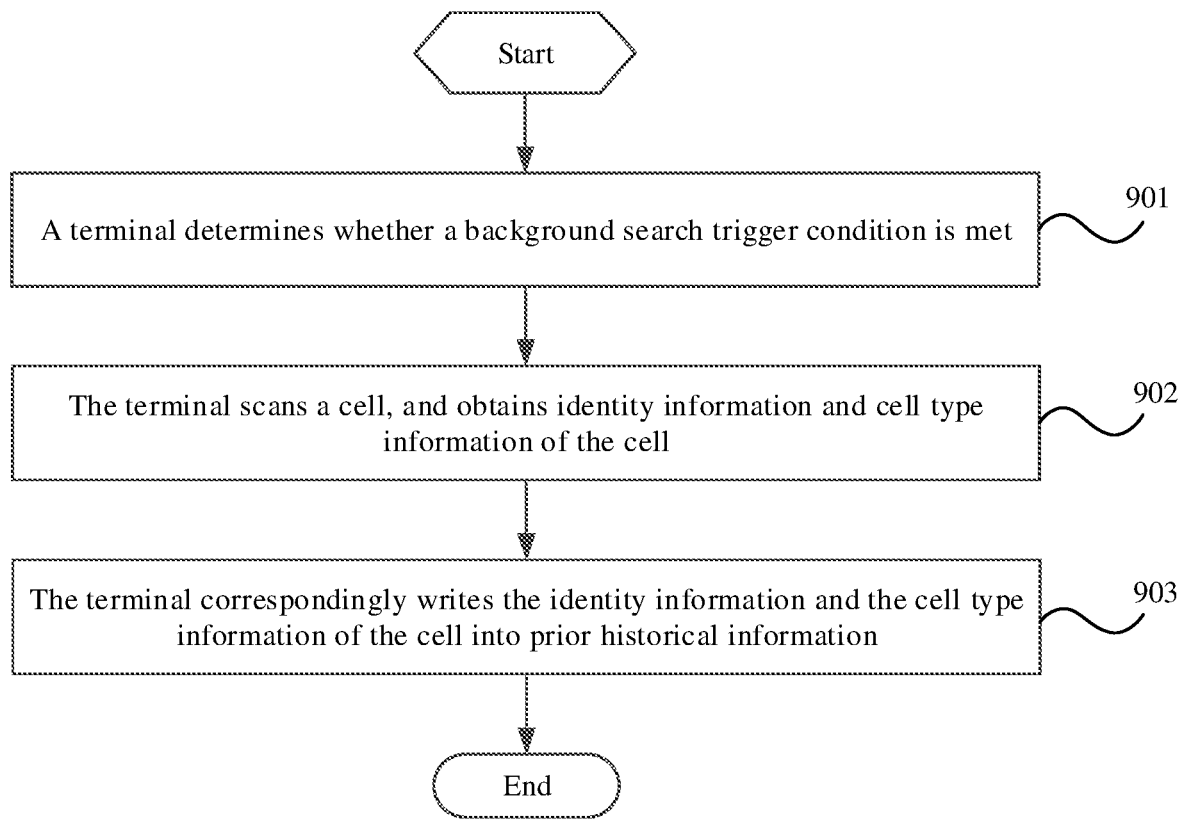
FIG. 12 is a schematic flowchart of a cell selection method according to an embodiment of this application.

The following describes a background search procedure of this application based on a specific embodiment. With reference to FIG. 1, FIG. 12 is an example schematic flowchart of a cell selection method. Specifically:

Step 901: A terminal determines whether a background search trigger condition is met.

Specifically, in this application, the RRC layer may determine, based on a current camping status of the terminal, whether a background search condition is met.

Optionally, the background search condition includes but is not limited to:

(1) No prior historical information is stored in the terminal.

(2) The terminal camps on a non-5G anchor cell. It may be understood that if the terminal fails to camp on a 5G anchor cell in the foregoing scenario 1 to scenario 3, the RRC layer performs a background search in this application, so as to expect the terminal to camp on a 5G anchor cell. The current camping scenario may include but is not limited to the following specific scenarios or conditions: The terminal is in an idle state, the terminal is in a connected state or in a night period, or the terminal is at a fixed location.

Optionally, after detecting that the terminal meets the foregoing background search condition, the RRC layer may wait for preset duration (which may be set based on an actual requirement, for example, 2 minutes) before performing a subsequent background search procedure.

Step 902: The terminal scans a cell, and obtains identity information and cell type information of the cell.

Specifically, in this application, the RRC layer may scan one or more cells to receive system messages of one or more cells. The RRC layer may read the system messages to obtain the identity information of the cells, and read system information blocks (System Information Block) 2 to obtain cell type information included in the system information blocks.

In a possible implementation, the one or more cells may be neighboring cells configured on the network side.

In another possible implementation, the one or more cells may be all cells that can be scanned by the RRC layer, or may be understood as full-band scanning.

Step 903: The terminal correspondingly writes the identity information and the cell type information of the cell into prior historical information.

Optionally, in this application, if the terminal does not store the prior historical information, the RRC layer in the terminal may generate a prior historical information table, and correspondingly write the obtained identity information of the one or more cells and the cell type information of each cell into the prior historical information.

Optionally, in this application, if the terminal stores the prior historical information, the RRC layer in the terminal correspondingly writes the obtained identity information of the one or more cells and the cell type information of each cell into the prior historical information, so as to update the prior historical information.

Optionally, in this application, when performing the background search, the terminal may further obtain frequency information of each cell, or may be understood as obtaining each cell at each frequency. The terminal may write the identity information of the frequency and the corresponding frequency type information into the prior historical information. If the frequency includes a 5G anchor cell, the frequency type information of the frequency is a 5G LTE frequency. It should be noted that a manner for recording a frequency and a cell may be shown in Table 1, that is, each frequency and each cell at the frequency may be obtained from Table 1. Optionally, frequencies may alternatively be recorded separately from cells. For example, the frequencies are recorded in a table, and the cells are recorded in another table. This is not limited in this application.

In a possible implementation, if the terminal camps on a non-5G anchor cell, the RRC layer completes the background search, and determines, by performing a background search process, that at least one 5G anchor cell is included in neighboring cells of the terminal, a procedure such as reselection or handover may be performed on the at least one 5G anchor cell. For example, the terminal may directly camp on or hand over to the 5G anchor cell, or the terminal may perform steps in scenario 1, scenario 2, or scenario 3 again based on updated prior historical information. This is not limited in this application.

The solutions provided in the embodiments of this application are mainly described from the perspective of interaction between various network elements. It may be understood that, to implement the foregoing functions, the terminal includes corresponding hardware structures and/or software modules for performing the functions. A person skilled in the art should be easily aware that units and algorithm steps in the examples described with reference to the embodiments disclosed in this specification may be implemented in a form of hardware or in a form of a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the technical solutions in the embodiments of this application.

In the embodiments, the terminal device may be divided into functional units based on the method examples. For example, each functional module may be obtained through division based on a corresponding function, or two or more functions may be integrated into one processing module. The foregoing integrated module may be implemented in a form of hardware, or may be implemented in a form of a software functional module. It should be noted that the module division in this embodiment of this application is an example and is merely logical function division, and there may be another division manner during actual implementation.

Figure 13:
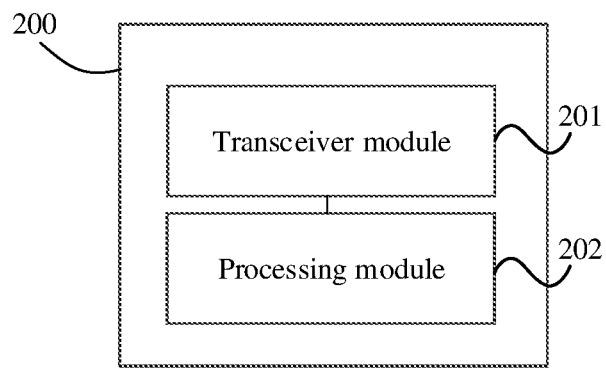
FIG. 13 is a schematic structural diagram of a terminal according to an embodiment of this application.

When each function module is divided based on corresponding functions, and when each function module is divided based on corresponding functions, FIG. 13 is a possible schematic structural diagram of a terminal 200 used in the foregoing embodiments. As shown in FIG. 13, the terminal 200 may include a transceiver module 201 and a processing module 202, where the transceiver module 201 is configured to receive a configuration message sent by a network side, and the configuration message includes frequency information. The processing module 202 is configured to determine a first measurement frequency based on locally stored prior historical information and the configuration message, where a historically camped cell corresponding to the first measurement frequency includes a 5G anchor cell, and the 5G anchor cell is a Long Term Evolution (LTE) cell that uses a 5G cell as a secondary cell. The processing module 202 is configured to perform cell measurement on the first measurement frequency to obtain a measurement result of the first measurement frequency, where the measurement result includes first cell identity information and a first cell measurement result corresponding to the first cell identity information. The processing module 202 is further configured to determine, based on the prior historical information and the first cell identity information, whether the first cell is a 5G anchor cell. The processing module 202 is further configured to: If the first cell is a 5G anchor cell and meets a preferred condition, evaluate the first cell based on first preset duration. The processing module 202 is further configured to: If the first cell is not a 5G anchor cell, evaluate the first cell based on second preset duration, where the second preset duration is greater than the first preset duration. The processing module 202 is further configured to: When an evaluation result of the first cell meets a preset condition, camp on the first cell, or report, by the transceiver module, the measurement result of the first cell to a base station.

Based on the foregoing technical solution, the preferred condition includes: A measurement result of the first cell is greater than or equal to a first threshold, or a difference between a cell measurement result of a currently camped serving cell that is obtained by the terminal through measurement and the first cell measurement result is less than or equal to a second threshold.

Based on the foregoing technical solution, the prior historical information includes historical frequency information of at least one frequency and cell information of a historically camped cell corresponding to each of the at least one frequency, where the historical frequency information includes frequency type information, and the cell information includes cell type information.

Based on the foregoing technical solution, the frequency information includes reselection frequency information of a reselection frequency, a priority corresponding to the reselection frequency, a first measurement threshold, and second preset evaluation duration; and the processing module 202 is specifically configured to determine the first measurement frequency based on the prior historical information and the reselection frequency information.

Based on the foregoing technical solution, the processing module 202 is further configured to: If the quality of service of the serving cell on which the terminal currently camps is greater than the first measurement threshold, and the priority corresponding to the first measurement frequency is less than or equal to a first priority corresponding to a frequency to which the serving cell belongs, increase, by the terminal, the first measurement threshold to be greater than the quality of service of the serving cell.

Based on the foregoing technical solution, the processing module 202 is further configured to: If the quality of service of the serving cell on which the terminal currently camps is greater than the first measurement threshold, and the priority corresponding to the first measurement frequency is lower than or equal to the first priority corresponding to the frequency to which the serving cell belongs, determine that the priority of the first measurement frequency is a second priority, where the second priority is higher than the first priority. The processing module 202 may be further specifically configured to evaluate the first cell by using a high-priority threshold, where the high-priority threshold is included in the configuration message.

Based on the foregoing technical solution, if the first cell is a 5G anchor cell and meets a preferred condition, the processing module 202 is further configured to: If the priority of the first measurement frequency is less than or equal to a first priority corresponding to a frequency of a serving cell on which the terminal currently camps, determine that the priority of the first measurement frequency is a second priority, where the second priority is higher than the first priority; and the processing module 202 is further configured to evaluate the first cell by using a high priority threshold, where the high priority threshold is included in the configuration message.

Based on the foregoing technical solution, the preset rule is a cell reselection rule, and the preset rule includes: A measurement result of the first cell is optimal in the obtained cell measurement results; or a difference between the first cell measurement result and the obtained optimal value in the cell measurement results is less than or equal to a third threshold.

Based on the foregoing technical solution, the frequency information includes frequency handover information of a handover frequency, a second measurement threshold, and second preset evaluation duration. The processing module 202 is specifically configured to determine the first measurement frequency based on the prior historical information and the frequency handover information; and if the quality of service of the serving cell on which the terminal currently camps is less than the second measurement threshold, and the serving cell is not a 5G anchor cell, the processing module 202 increases the second measurement threshold to be greater than the quality of service of the serving cell.

Based on the foregoing technical solution, the preset condition is a cell handover condition.

Based on the foregoing technical solution, the processing module 202 is further configured to add a first cell measurement result to the terminal to obtain a second cell measurement result, where a difference between the second cell measurement result and the first cell measurement result is less than or equal to a fourth threshold. The processing module 202 may be further specifically configured to evaluate the measurement result of the second cell by the terminal. The measurement result of the first cell and the measurement result of the second cell include at least one of the following: Reference signal receive power RSRP, and a signal to interference plus noise ratio SINR.

Based on the foregoing technical solution, if the first cell is not a 5G anchor cell, and the terminal camps on the first cell, the processing module 202 is further configured to obtain a system message of a neighboring cell, where the system message includes identity information of the neighboring cell and cell type information corresponding to the identity information of the neighboring cell. The processing module 202 is further configured to correspondingly write the identity information of the neighboring cell and the cell type information into the prior historical information, where the neighboring cell is a cell configured on a network side, or the neighboring cell is a cell from which the terminal can receive the system message.

Based on the foregoing technical solution, the cell type information is included in a system message SIB2 of a neighboring cell.

Figure 14:
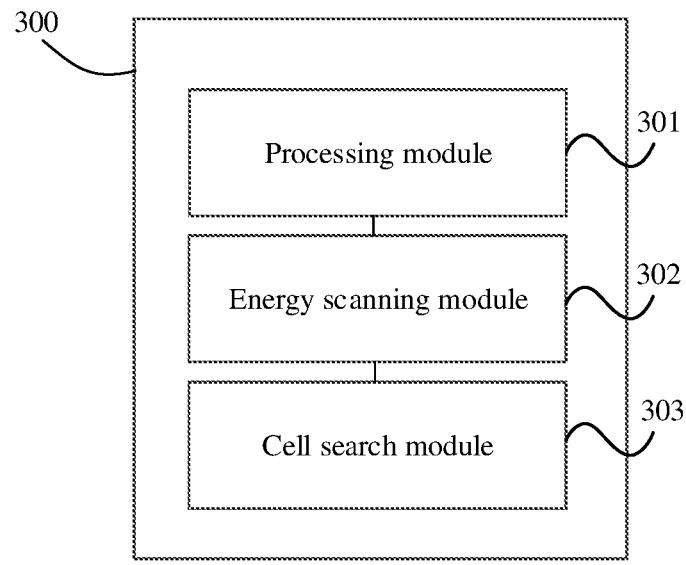
FIG. 14 is a schematic structural diagram of a terminal according to an embodiment of this application.

FIG. 14 is a possible schematic structural diagram of the terminal 300 used in the foregoing embodiment. As shown in FIG. 14, the terminal 300 may include a processing module 301, an energy scanning module 302, and a cell search module 303. The processing module 301 is configured to determine at least one candidate frequency based on locally stored prior historical information, where at least one 5G LTE frequency is included in the at least one candidate frequency, a historically camped cell corresponding to the 5G LTE frequency includes a 5G anchor cell, and the 5G anchor cell is a Long Term Evolution (LTE) cell that uses the 5G cell as a secondary cell. The energy scanning module 302 is configured to perform energy scanning on the at least one candidate frequency to obtain an energy scanning result of a single candidate frequency in the at least one candidate frequency. The cell search module 303 is configured to: If a preferred frequency is included in at least one 5G LTE frequency, preferentially perform a cell search on the preferred frequency, where an energy scanning result of the preferred frequency meets a preferred condition. The processing module 304 is further configured to: If a first cell that meets a camping condition exists at a preferred frequency, camp on the first cell.

Based on the foregoing technical solution, the prior historical information includes frequency information of at least one candidate frequency and cell information of a cell at a single candidate frequency. That the terminal determines at least one candidate frequency based on locally stored prior historical information includes: The terminal determines a 5G LTE frequency based on the frequency information, where the frequency information includes frequency type information; or the terminal determines a 5G LTE frequency based on the cell information, where the cell information includes cell type information.

Based on the foregoing technical solution, the preferred condition includes: An energy scanning result of the preferred frequency is greater than or equal to a first threshold; or a difference between an energy scanning result corresponding to a candidate frequency with a largest energy scanning result and an energy scanning result corresponding to the preferred frequency is less than or equal to a second threshold.

Based on the foregoing technical solution, the processing module 301 is specifically configured to obtain a cell search result of the preferred frequency, where the cell search result includes cell identity information and a cell measurement result corresponding to the cell identity information; and determine a preferred cell based on the prior historical information, the cell identity information, and the corresponding cell measurement result, and camp on the preferred cell; and the preferred cell is a 5G anchor cell that meets the camping condition.

Based on the foregoing technical solution, the camping condition includes: The cell measurement result of the preferred cell is optimal in the obtained cell measurement results; or a difference between the cell measurement result of the preferred cell and the obtained optimal value of the cell measurement result is less than or equal to a third threshold.

Based on the foregoing technical solution, if the serving cell on which the terminal camps is a non-5G anchor cell, the processing module 301 is further configured to obtain a system message of a neighboring cell, where the system message includes identity information of the neighboring cell and cell type information corresponding to the identity information of the neighboring cell; and the processing module 301 is further configured to correspondingly write the identity information of the neighboring cell and the cell type information into prior historical information; and the neighboring cell is a cell configured on a network side, or the neighboring cell is a cell from which the terminal can receive the system message.

Based on the foregoing technical solution, the cell type information is included in a system message SIB2 of a neighboring cell.

All related content of the steps in the foregoing method embodiments may be cited in function descriptions of corresponding function modules. Details are not described herein again.

The following describes an apparatus provided in an embodiment of this application.

Figure 15:
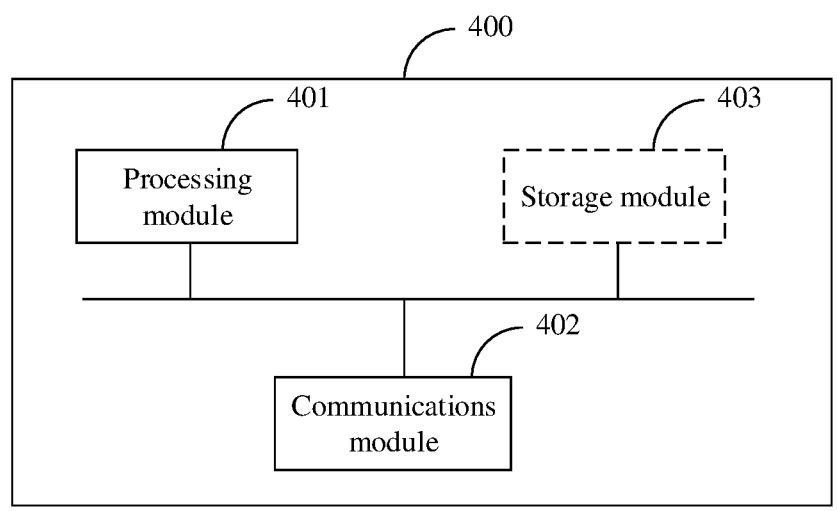
FIG. 15 is a schematic structural diagram of an apparatus according to an embodiment of this application.

As shown in FIG. 15:

The apparatus includes a processing module 401 and a communications module 402.

Optionally, the apparatus further includes a storage module 403. The processing module 401, the communications module 402, and the storage module 403 are connected by using a communications bus.

The communications module 402 may be an apparatus with a transceiver function, and is configured to communicate with another network device or a communications network.

The storage module 403 may include one or more memories, and the memory may be a device used to store programs or data in one or more devices or circuits.

The storage module 403 may independently exist and be connected to the processing module 401 by using the communications bus. The storage module may alternatively be integrated with the processing module 401.

The apparatus 400 may be used in a network device, a circuit, a hardware component, or a chip.

Figure 2:
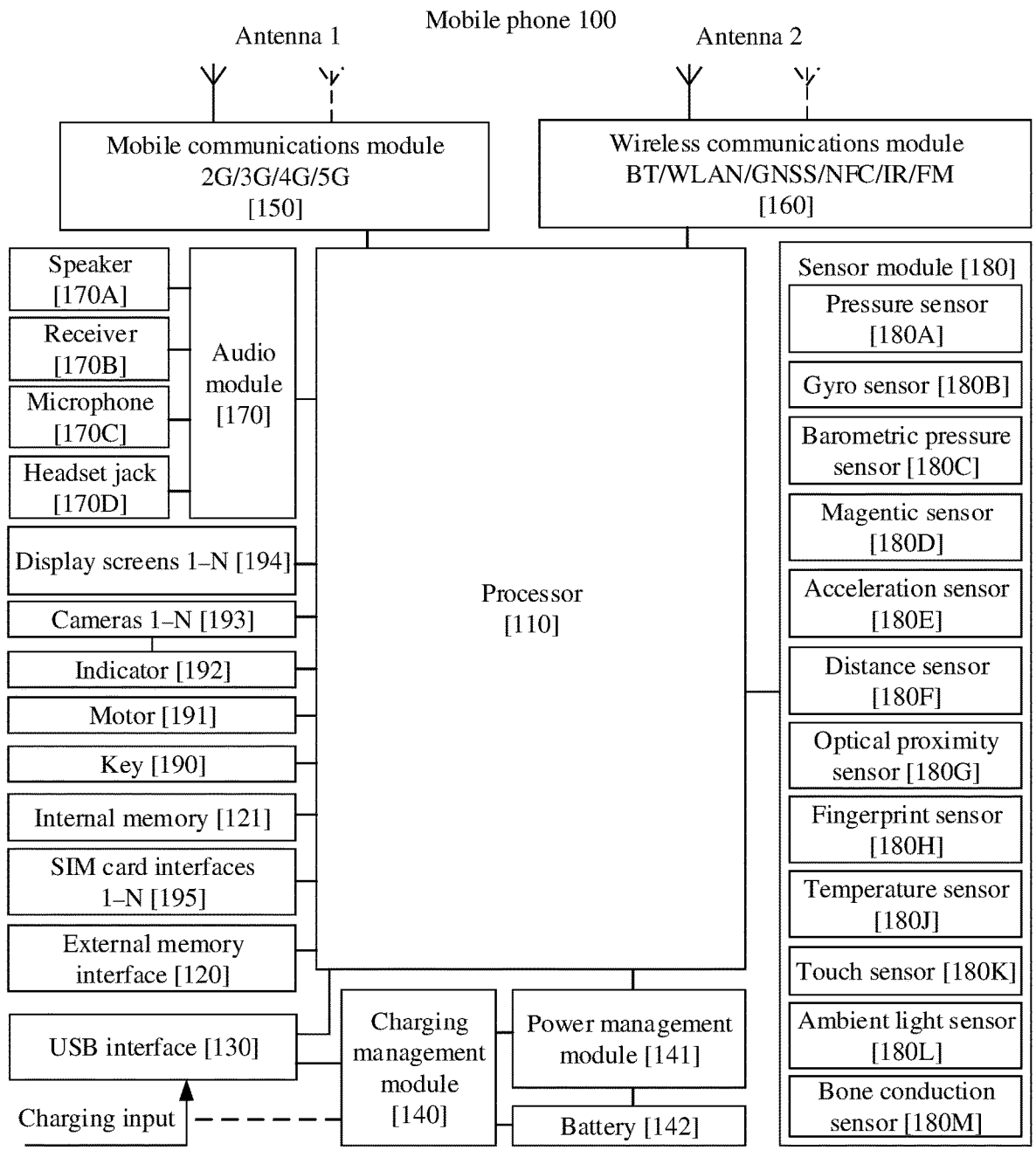
FIG. 2 is a schematic structural diagram of an example terminal.

The apparatus 400 may be a terminal in the embodiments of this application. A schematic diagram of the terminal may be shown in FIG. 2. Optionally, the communications module 402 of the apparatus 400 may include an antenna and a transceiver of a terminal. Optionally, the communications module 402 may further include an output device and an input device.

The apparatus 400 may be a chip in the terminal in the embodiments of this application. The communications module 402 may be an input or output interface, a pin, a circuit, or the like. Optionally, the storage module may store a computer execution instruction of a method on the terminal side, so that the processing module 401 performs the method on the terminal side in the foregoing embodiments. The storage module 403 may be a register, a cache, a RAM, or the like, and the storage module 403 may be integrated with the processing module 401. The storage module 403 may be a ROM or another type of static storage device that may store static information and instructions, and the storage module 403 may be independent of the processing module 401. Optionally, with the development of wireless communications technologies, the transceiver may be integrated into the apparatus 400.

When the apparatus 400 is a terminal in the embodiments of this application or a chip in the terminal, the apparatus 400 may implement the method performed by the terminal in the foregoing embodiments. Details are not described herein again.

An embodiment of this application further provides a computer readable storage medium. The method described in the foregoing embodiments may be completely or partially implemented by software, hardware, firmware, or a combination thereof. If the method is implemented by software, a function may be stored or transmitted on the computer readable medium as one or more instructions or code. The computer readable medium may include a computer storage medium and a communications medium, and may further include any medium that can transmit a computer program from one place to another. The storage medium may be any available medium accessible to a computer.

In an optional design, the computer readable medium may include a RAM, a ROM, an EEPROM, a CD-ROM or another optical disk memory, a magnetic disk memory or another magnetic storage device, or any other medium that may be used to carry or store required program code in a form of an instruction or a data structure, and may be accessed by a computer. Further, any connection is appropriately referred to as a computer readable medium. For example, if a coaxial cable, a fiber optic cable, a twisted pair, a digital subscriber line (DSL) or a wireless technology (such as infrared, radio, or microwave) are used to transmit software from a website, a server, or another remote source, the coaxial cable, the fiber optic cable, the twisted pair, the DSL, or the wireless technology (such as infrared, radio, or microwave) are included in the definition of a medium. A disk and an optical disc used herein include an optical disc (CD), a laser disc, an optical disc, a digital versatile disc (DVD), a floppy disk, and a Blue-ray disc, where the disk generally reproduces data in a magnetic manner, and the optical disc reproduces data optically by using a laser. The foregoing combination should also be included in the scope of the computer readable medium.

An embodiment of this application further provides a computer program product.

The method described in the foregoing embodiments may be completely or partially implemented by software, hardware, firmware, or a combination thereof. If the method is implemented by software, the method may be completely or partially implemented in the form of a computer program product. The computer program product includes one or more computer instructions. When the computer program instruction is loaded and executed on the computer, the procedure or function based on the embodiments of this application are completely or partially generated. The computer may be a general-purpose computer, a special-purpose computer, a computer network, or another programmable apparatus.

The embodiments of this application are described above with reference to the accompanying drawings. However, this application is not limited to the foregoing specific implementations. The foregoing specific implementations are merely examples, but are not limiting. A person of ordinary skill in the art may make many forms without departing from the objective and the protection scope of the claims of this application, and such forms shall fall within the protection scope of this application.

What is claimed is:

1. A cell selection method, comprising:
receiving, by a terminal, a configuration message sent by a network side, wherein the configuration message comprises frequency information;
determining, by the terminal, a first measurement frequency based on locally stored prior historical information and the configuration message, wherein a historically camped cell corresponding to the first measurement frequency comprises a 5G anchor cell, and the 5G anchor cell is a Long Term Evolution (LTE) cell that uses a 5G cell as a secondary cell;
performing, by the terminal, cell measurement on the first measurement frequency, and obtaining a measurement result of the first measurement frequency, wherein the measurement result comprises first cell identity information and a first cell measurement result corresponding to the first cell identity information;
determining, by the terminal based on the prior historical information and the first cell identity information, whether a first cell is a 5G anchor cell;
if the first cell is a 5G anchor cell and meets a first condition, evaluating the first cell based on first preset duration; or if the first cell is not a 5G anchor cell, evaluating the first cell based on second preset duration, wherein the second preset duration is greater than the first preset duration; and when an evaluation result of the first cell meets a preset condition, camping, by the terminal, on the first cell, or reporting, by the terminal, the measurement result of the first cell to a base station.

2. The method according to claim 1, wherein the first condition comprises:

the measurement result of the first cell is greater than or equal to a first threshold, or a difference between a quality of service of a currently camped serving cell that is obtained by the terminal through measurement and the first cell measurement result is less than or equal to a second threshold.

3. The method according to claim 1, wherein the prior historical information comprises historical frequency information of at least one frequency and cell information of a historically camped cell corresponding to each of the at least one frequency, and the cell information comprises cell type information.

4. The method according to claim 3, wherein the frequency information comprises reselection frequency information of a reselection frequency, a priority corresponding to the reselection frequency, a first measurement threshold, and a second preset evaluation duration; and the determining, by the terminal, a first measurement frequency based on locally stored prior historical information and the configuration message comprises:

determining, by the terminal, the first measurement frequency based on the prior historical information and the reselection frequency information.

5. The method according to claim 4, wherein after the determining, by the terminal, a first measurement frequency based on locally stored prior historical information and the configuration message, the method comprises:

if a quality of service of a serving cell on which the terminal currently camps is greater than the first measurement threshold, and a priority corresponding to the first measurement frequency is lower than or equal to a first priority corresponding to a frequency to which the serving cell belongs, increasing, by the terminal, the first measurement threshold to be greater than the quality of service of the serving cell.

6. The method according to claim 4, wherein the first cell is a 5G anchor cell and meets the first condition, and the method further comprises:

if the priority of the first measurement frequency is lower than or equal to a first priority corresponding to a frequency of a serving cell on which the terminal currently camps, determining that the priority of the first measurement frequency is a second priority, wherein the second priority is greater than the first priority; and wherein the evaluating the first cell based on first preset duration comprises:

evaluating, by the terminal, the first cell by using a high-priority threshold, wherein the high-priority threshold is comprised in the configuration message.

7. The method according to claim 1, wherein the preset condition is a cell reselection rule, and the preset condition comprises:

the first cell measurement result is optimal in the obtained cell measurement results; or a difference between the first cell measurement result and an optimal value in the obtained cell measurement results is less than or equal to a third threshold.

8. The method according to claim 7, wherein the frequency information comprises frequency handover information of a frequency handover, a second measurement threshold, and the second preset duration; and wherein the determining, by the terminal, a first measurement frequency based on locally stored prior historical information and the configuration message comprises:

determining, by the terminal, the first measurement frequency based on the prior historical information and the frequency handover information; and if a quality of service of a serving cell on which the terminal currently camps is lower than the second measurement threshold, and the serving cell is not a 5G anchor cell, increasing, by the terminal, the second measurement threshold to be greater than the quality of service of the serving cell.

9. The method according to claim 8, wherein the preset condition is a cell handover condition.

10. The method according to claim 1, wherein before the evaluating the first cell based on first preset duration, the method further comprises:

adding, by the terminal, a first cell measurement result to obtain a second cell measurement result, wherein a difference between the second cell measurement result and the first cell measurement result is less than or equal to a fourth threshold; and wherein the evaluating the first cell based on first preset duration comprises:

evaluating, by the terminal, the measurement result of the second cell, wherein the measurement result of the first cell and the measurement result of the second cell comprise at least one of the following: reference signal received power (RSRP) and a signal to interference plus noise ratio (SINR).

11. An apparatus, comprising:

a memory and a processor, wherein the memory is coupled to the processor;

the memory stores a program instruction, and when the program instruction is run by the processor, the apparatus is enabled to perform the following steps:

receiving a configuration message sent by a network side, wherein the configuration message comprises frequency information;

determining a first measurement frequency based on locally stored prior historical information and the configuration message, wherein a historically camped cell corresponding to the first measurement frequency comprises a 5G anchor cell, and the 5G anchor cell is a Long Term Evolution (LTE) cell that uses a 5G cell as a secondary cell;

performing cell measurement on the first measurement frequency, and obtaining a measurement result of the first measurement frequency, wherein the measurement result comprises first cell identity information and a first cell measurement result corresponding to the first cell identity information;

determining, based on the prior historical information and the first cell identity information, whether a first cell is a 5G anchor cell;

if the first cell is a 5G anchor cell and meets a first condition, evaluating the first cell based on first preset duration; or if the first cell is not a 5G anchor cell, evaluating the first cell based on second preset duration, wherein the second preset duration is greater than the first preset duration; and when an evaluation result of the first cell meets a preset condition, camping on the first cell, or reporting, the measurement result of the first cell to a base station.

12. The apparatus according to claim 11, wherein the first condition comprises:

the measurement result of the first cell is greater than or equal to a first threshold, or a difference between quality of service of a currently camped serving cell that is obtained by the apparatus through measurement and the first cell measurement result is less than or equal to a second threshold.

13. The apparatus according to claim 11, wherein the prior historical information comprises historical frequency information of at least one frequency and cell information of a historically camped cell corresponding to each of the at least one frequency, and the cell information comprises cell type information.

14. The apparatus according to claim 13, wherein the frequency information comprises reselection frequency information of a reselection frequency, a priority corresponding to the reselection frequency, a first measurement threshold, and a second preset evaluation duration; and when the program instruction is run by the processor, the apparatus is enabled to perform the following steps:

determining the first measurement frequency based on the prior historical information and the reselection frequency information.

15. The apparatus according to claim 14, wherein when the program instruction is run by the processor, the apparatus is enabled to perform the following steps:

if a quality of service of a serving cell on which the terminal currently camps is greater than the first measurement threshold, and a priority corresponding to the first measurement frequency is lower than or equal to a first priority corresponding to a frequency to which the serving cell belongs, increasing the first measurement threshold to be greater than the quality of service of the serving cell.

16. The apparatus according to claim 14, wherein if the first cell is a 5G anchor cell and meets the first condition, when the program instruction is run by the processor, the apparatus is enabled to perform the following steps:

if the priority of the first measurement frequency is lower than or equal to a first priority corresponding to a frequency of a serving cell on which the terminal currently camps, determining that the priority of the first measurement frequency is a second priority, wherein the second priority is greater than the first priority; and evaluating the first cell by using a high-priority threshold, wherein the high-priority threshold is comprised in the configuration message.

17. The apparatus according to claim 11, wherein the preset condition is a cell reselection rule, and the preset condition comprises:

the first cell measurement result is optimal in the obtained cell measurement results; or a difference between the first cell measurement result and an optimal value in the obtained cell measurement results is less than or equal to a third threshold.

18. The apparatus according to claim 17, wherein the frequency information comprises frequency handover information of a frequency handover, a second measurement threshold, and the second preset duration; and when the program instruction is run by the processor, the apparatus is enabled to perform the following steps:

determining the first measurement frequency based on the prior historical information and the frequency handover information; and if a quality of service of a serving cell on which the terminal currently camps is lower than the second measurement threshold, and the serving cell is not a 5G anchor cell, increasing, the second measurement threshold to be greater than the quality of service of the serving cell.

19. The apparatus according to claim 11, wherein when the program instruction is run by the processor, the apparatus is enabled to perform the following steps:

adding a first cell measurement result to obtain a second cell measurement result, wherein a difference between the second cell measurement result and the first cell measurement result is less than or equal to a fourth threshold; and evaluating the measurement result of the second cell, wherein the measurement result of the first cell and the measurement result of the second cell comprise at least one of the following: reference signal received power (RSRP) and a signal to interference plus noise ratio (SINR).

20. The apparatus according to claim 11, wherein if the first cell is not a 5G anchor cell, the terminal camps on the first cell, when the program instruction is run by the processor, the apparatus is enabled to perform the following steps:

obtaining a system message of a neighboring cell, wherein the system message comprises identity information of the neighboring cell and cell type information corresponding to the identity information of the neighboring cell; and correspondingly writing the identity information of the neighboring cell and the cell type information into the prior historical information, wherein the neighboring cell is a cell configured on a network side, or the neighboring cell is a cell from which the apparatus can receive the system message.

* * * * *